(12) United States Patent
Chaurasia et al.

(10) Patent No.: US 11,700,510 B2
(45) Date of Patent: Jul. 11, 2023

(54) METHODS, SYSTEMS, AND COMPUTER READABLE MEDIA FOR SHORT MESSAGE DELIVERY STATUS REPORT VALIDATION

(71) Applicant: Oracle International Corporation, Redwood Shores, CA (US)

(72) Inventors: Rajeev Chaurasia, New Delhi (IN); Vipin Kumar, Bangalore (IN); Ravindra Madhukar Patil, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/175,260

(22) Filed: Feb. 12, 2021

(65) Prior Publication Data
US 2022/0264260 A1    Aug. 18, 2022

(51) Int. Cl.
  *H04W 4/14*      (2009.01)
  *H04W 4/16*      (2009.01)
  *H04W 4/029*    (2018.01)
(52) U.S. Cl.
  CPC ............. *H04W 4/14* (2013.01); *H04W 4/029* (2018.02); *H04W 4/16* (2013.01)
(58) Field of Classification Search
  CPC .......... H04W 4/14; H04W 4/029; H04W 4/16
  See application file for complete search history.

(56) References Cited

U.S. PATENT DOCUMENTS

| | | | |
|---|---|---|---|
| 6,091,958 | A | 7/2000 | Bergkvist et al. |
| 6,151,503 | A | 11/2000 | Chavez |
| 6,292,666 | B1 | 9/2001 | Siddiqui et al. |
| 6,308,075 | B1 | 10/2001 | Irten et al. |
| 6,343,215 | B1 | 1/2002 | Calabrese et al. |
| 6,591,101 | B1 | 7/2003 | Shimbori |

(Continued)

FOREIGN PATENT DOCUMENTS

| | | |
|---|---|---|
| CN | 101277541 A | 10/2008 |
| CN | 10135561 A | 1/2009 |

(Continued)

OTHER PUBLICATIONS

Communication of European publication number and information on the application of Article 67(3) EPC for European Patent Application Serial No. 19730571.7 (dated Apr. 8, 2021).

(Continued)

*Primary Examiner* — Dai Phuong
(74) *Attorney, Agent, or Firm* — Jenkins, Wilson, Taylor & Hunt, P.A.

(57) ABSTRACT

Methods, systems, and computer readable media for short message delivery status report validation are disclosed. One method occurs at a first network node. The method includes receiving a short message delivery status report appearing to be associated with a short message delivery to a mobile subscriber; determining, using a data store containing information about short message delivery attempts, whether the short message delivery status report is valid or invalid, wherein the information about the short message delivery attempts indicates a validation time period for receiving a valid short message delivery status report; and performing a processing action based on the determination.

17 Claims, 6 Drawing Sheets

(56) References Cited

U.S. PATENT DOCUMENTS

| | | |
|---|---|---|
| 7,043,754 B2 | 5/2006 | Arnouse |
| 7,269,431 B1 | 9/2007 | Gilbert |
| 7,319,880 B2 | 1/2008 | Sin |
| 7,567,661 B1 | 7/2009 | Wood et al. |
| 7,761,105 B2 | 7/2010 | Harding |
| 8,045,956 B2 | 10/2011 | Sun et al. |
| 8,145,234 B1 | 3/2012 | Leonard et al. |
| 8,509,074 B1 | 8/2013 | Roberts et al. |
| 8,615,217 B2 | 12/2013 | Ravishankar et al. |
| 8,879,431 B2 | 11/2014 | Ridel et al. |
| 9,015,808 B1 | 4/2015 | Koller et al. |
| 9,025,445 B2 | 5/2015 | Jain et al. |
| 9,060,263 B1 | 6/2015 | Carames et al. |
| 9,106,428 B2 | 8/2015 | Matthews et al. |
| 9,106,769 B2 | 8/2015 | Kanode et al. |
| 9,191,803 B2 | 11/2015 | Patel et al. |
| 9,240,946 B2 | 1/2016 | Cai et al. |
| 9,374,840 B2 | 6/2016 | Monedero Recuero |
| 9,432,150 B2 | 8/2016 | Jain et al. |
| 9,467,508 B2 | 10/2016 | Xu |
| 9,538,335 B1 | 1/2017 | Bank et al. |
| 9,621,450 B2 | 4/2017 | Jeong et al. |
| 9,628,994 B1 | 4/2017 | Gunyel et al. |
| 9,681,360 B1 | 6/2017 | Salyers et al. |
| 9,912,486 B1 | 3/2018 | Sharifi Mehr |
| 10,009,751 B2 | 6/2018 | Gundavelli et al. |
| 10,021,738 B1 | 7/2018 | Mehta et al. |
| 10,045,326 B2 | 8/2018 | Blanchard et al. |
| 10,168,413 B2 | 1/2019 | Annamalai et al. |
| 10,212,538 B2 | 2/2019 | Russell |
| 10,230,726 B2 | 3/2019 | Barkan |
| 10,237,721 B2 | 3/2019 | Gupta et al. |
| 10,306,459 B1 | 5/2019 | Patil et al. |
| 10,313,883 B2 | 6/2019 | Krishan |
| 10,334,419 B2 | 6/2019 | Aravamudhan et al. |
| 10,405,158 B2 | 9/2019 | McCann |
| 10,448,449 B2 | 10/2019 | Aravamudhan et al. |
| 10,470,154 B2 | 11/2019 | Chellamani et al. |
| 10,506,403 B2 | 12/2019 | McCann |
| 10,511,998 B1 * | 12/2019 | Vallur .................. H04W 28/04 |
| 10,530,599 B2 | 1/2020 | McCann |
| 10,602,441 B2 | 3/2020 | Palanisamy et al. |
| 10,616,200 B2 | 4/2020 | Kumar et al. |
| 10,616,802 B2 | 4/2020 | Krishan et al. |
| 10,637,838 B1 * | 4/2020 | Larios .................... H04L 63/08 |
| 10,652,850 B2 | 5/2020 | Landais et al. |
| 10,776,791 B2 | 9/2020 | Ferguson et al. |
| 10,827,332 B2 | 11/2020 | McCann |
| 10,834,045 B2 | 11/2020 | Mahalank et al. |
| 10,834,571 B1 | 11/2020 | Yau et al. |
| 10,931,668 B2 | 2/2021 | Mehta |
| 10,952,063 B2 | 3/2021 | Mehta |
| 10,984,128 B1 | 4/2021 | Hoffer |
| 11,050,788 B2 | 6/2021 | Livanos |
| 11,068,534 B1 | 7/2021 | Svendsen |
| 11,140,555 B2 | 10/2021 | Thai et al. |
| 11,146,577 B2 | 10/2021 | Gupta et al. |
| 11,265,695 B2 | 3/2022 | Shah et al. |
| 11,272,560 B1 | 3/2022 | Vivanco et al. |
| 11,368,839 B2 | 6/2022 | Targali |
| 11,381,955 B2 | 7/2022 | Aravind et al. |
| 11,411,925 B2 | 8/2022 | Kumar et al. |
| 11,516,671 B2 | 11/2022 | Rajput et al. |
| 11,528,251 B2 | 12/2022 | Rajput et al. |
| 11,553,342 B2 | 1/2023 | Mahalank et al. |
| 2001/0046856 A1 | 11/2001 | McCann |
| 2002/0080752 A1 | 6/2002 | Johansson et al. |
| 2002/0098856 A1 | 7/2002 | Berg et al. |
| 2002/0181448 A1 | 12/2002 | Uskela et al. |
| 2002/0187794 A1 | 12/2002 | Fostick et al. |
| 2002/0193127 A1 | 12/2002 | Martschitsch |
| 2003/0087647 A1 | 5/2003 | Hurst |
| 2004/0140908 A1 | 7/2004 | Gladwin et al. |
| 2004/0171393 A1 | 9/2004 | Harding |
| 2005/0182968 A1 | 8/2005 | Izatt et al. |
| 2005/0220019 A1 | 10/2005 | Melpignano |
| 2005/0232236 A1 | 10/2005 | Allison et al. |
| 2006/0068762 A1 | 3/2006 | Baldwin et al. |
| 2006/0075481 A1 | 4/2006 | Ross et al. |
| 2006/0136560 A1 | 6/2006 | Jiang |
| 2006/0193258 A1 | 8/2006 | Ballai |
| 2006/0211406 A1 | 9/2006 | Szucs et al. |
| 2006/0242414 A1 | 10/2006 | Corson et al. |
| 2007/0011261 A1 | 1/2007 | Madams et al. |
| 2007/0093260 A1 | 4/2007 | Billing et al. |
| 2007/0165527 A1 | 7/2007 | Sultan et al. |
| 2007/0165626 A1 | 7/2007 | Sultan et al. |
| 2007/0174082 A1 | 7/2007 | Singh |
| 2007/0223372 A1 | 9/2007 | Haalen et al. |
| 2007/0248032 A1 | 10/2007 | Vasudevan et al. |
| 2007/0281718 A1 | 12/2007 | Nooren |
| 2007/0297333 A1 | 12/2007 | Zuk et al. |
| 2008/0004047 A1 | 1/2008 | Hill et al. |
| 2008/0020704 A1 | 1/2008 | Costa |
| 2008/0026778 A1 | 1/2008 | Cai et al. |
| 2008/0045246 A1 | 2/2008 | Murtagh et al. |
| 2008/0051061 A1 | 2/2008 | Takahashi |
| 2008/0076430 A1 | 3/2008 | Olson |
| 2008/0125116 A1 | 5/2008 | Jiang |
| 2008/0168540 A1 | 7/2008 | Agarwal et al. |
| 2008/0171549 A1 | 7/2008 | Hursey et al. |
| 2008/0207181 A1 | 8/2008 | Jiang |
| 2008/0222038 A1 | 9/2008 | Eden |
| 2008/0259798 A1 | 10/2008 | Loh et al. |
| 2009/0045251 A1 | 2/2009 | Jaiswal et al. |
| 2009/0168719 A1 | 7/2009 | Mercurio |
| 2009/0191915 A1 | 7/2009 | Abramson et al. |
| 2009/0195349 A1 | 8/2009 | Frader-Thompson et al. |
| 2010/0062789 A1 | 3/2010 | Agarwal et al. |
| 2010/0098414 A1 | 4/2010 | Kramer et al. |
| 2010/0100958 A1 | 4/2010 | Jeremiah |
| 2010/0105355 A1 | 4/2010 | Nooren |
| 2010/0130227 A1 | 5/2010 | Farthofer et al. |
| 2010/0161817 A1 | 6/2010 | Xiao et al. |
| 2010/0223222 A1 | 9/2010 | Zhou et al. |
| 2010/0235911 A1 | 9/2010 | Nooren |
| 2010/0240361 A1 | 9/2010 | Jiang |
| 2010/0313024 A1 | 12/2010 | Weniger et al. |
| 2011/0009085 A1 | 1/2011 | Albanes et al. |
| 2011/0014939 A1 | 1/2011 | Ravishankar et al. |
| 2011/0029655 A1 | 2/2011 | Forbes, Jr. et al. |
| 2011/0063126 A1 | 3/2011 | Kennedy et al. |
| 2011/0124317 A1 | 5/2011 | Joo |
| 2011/0124334 A1 | 5/2011 | Brisebois et al. |
| 2011/0158090 A1 | 6/2011 | Riley et al. |
| 2011/0173122 A1 | 7/2011 | Singhal |
| 2011/0191835 A1 | 8/2011 | Hawkes et al. |
| 2011/0217979 A1 | 9/2011 | Nas |
| 2011/0225091 A1 | 9/2011 | Plastina et al. |
| 2011/0246178 A1 | 10/2011 | Arzelier |
| 2011/0307381 A1 | 12/2011 | Kim et al. |
| 2012/0099715 A1 | 4/2012 | Ravishankar et al. |
| 2012/0110637 A1 | 5/2012 | Holtmanns et al. |
| 2012/0115512 A1 | 5/2012 | Grainger et al. |
| 2012/0131121 A1 | 5/2012 | Snyder et al. |
| 2012/0202481 A1 | 8/2012 | Martin |
| 2012/0203663 A1 | 8/2012 | Sinclair et al. |
| 2012/0207015 A1 | 8/2012 | Marsico |
| 2012/0207113 A1 | 8/2012 | Yoon et al. |
| 2012/0233694 A1 | 9/2012 | Baliga et al. |
| 2013/0035118 A1 | 2/2013 | Hamano et al. |
| 2013/0041997 A1 | 2/2013 | Li et al. |
| 2013/0044596 A1 | 2/2013 | Zhi et al. |
| 2013/0064158 A1 | 3/2013 | Sundell et al. |
| 2013/0080782 A1 | 3/2013 | Rajadurai et al. |
| 2013/0081138 A1 | 3/2013 | Rados et al. |
| 2013/0102231 A1 | 4/2013 | Joseph et al. |
| 2013/0102310 A1 | 4/2013 | Malonda |
| 2013/0171988 A1 | 7/2013 | Yeung et al. |
| 2013/0272247 A1 | 10/2013 | Guo |
| 2013/0276035 A1 | 10/2013 | Walker et al. |
| 2013/0331063 A1 | 12/2013 | Cormier et al. |
| 2013/0336305 A1 | 12/2013 | Yan et al. |
| 2014/0078968 A1 | 3/2014 | Korhonen et al. |

(56) References Cited

U.S. PATENT DOCUMENTS

| | | |
|---|---|---|
| 2014/0086214 A1 | 3/2014 | Hong et al. |
| 2014/0089442 A1 | 3/2014 | Kim et al. |
| 2014/0153391 A1 | 6/2014 | Ludwig et al. |
| 2014/0195630 A1 | 7/2014 | Malik et al. |
| 2014/0199961 A1 | 7/2014 | Mohammed et al. |
| 2014/0199996 A1 | 7/2014 | Wang et al. |
| 2014/0259012 A1 | 9/2014 | Nandlall et al. |
| 2014/0280645 A1 | 9/2014 | Shuman et al. |
| 2014/0334386 A1 | 11/2014 | Fukumasa et al. |
| 2014/0370922 A1 | 12/2014 | Richards |
| 2014/0376426 A1 | 12/2014 | Boudreau et al. |
| 2014/0376454 A1 | 12/2014 | Boudreau et al. |
| 2014/0378129 A1 | 12/2014 | Jiang et al. |
| 2015/0012415 A1 | 1/2015 | Livne et al. |
| 2015/0036591 A1 | 2/2015 | Cao et al. |
| 2015/0038156 A1 | 2/2015 | Kilpatrick, II et al. |
| 2015/0055459 A1 | 2/2015 | Wong et al. |
| 2015/0067328 A1 | 3/2015 | Yin |
| 2015/0081579 A1 | 3/2015 | Brown et al. |
| 2015/0094060 A1 | 4/2015 | Kouridakis et al. |
| 2015/0111533 A1 | 4/2015 | Chandramouli et al. |
| 2015/0111574 A1 | 4/2015 | Fukumasa et al. |
| 2015/0119092 A1* | 4/2015 | Yi .................... H04W 4/14 455/466 |
| 2015/0121078 A1 | 4/2015 | Fu et al. |
| 2015/0188979 A1 | 7/2015 | Almeras et al. |
| 2015/0235164 A1 | 8/2015 | Key |
| 2015/0244486 A1 | 8/2015 | Liang et al. |
| 2015/0256440 A1 | 9/2015 | Jeong et al. |
| 2015/0304220 A1 | 10/2015 | Miyao |
| 2015/0304803 A1 | 10/2015 | Chen et al. |
| 2015/0319172 A1 | 11/2015 | Zhang et al. |
| 2015/0341341 A1 | 11/2015 | Messerges |
| 2015/0350196 A1 | 12/2015 | Toyonaga et al. |
| 2016/0007138 A1 | 1/2016 | Palanisamy et al. |
| 2016/0007170 A1 | 1/2016 | Vaidya et al. |
| 2016/0085594 A1 | 3/2016 | Wang et al. |
| 2016/0088461 A1 | 3/2016 | Jiang |
| 2016/0119773 A1 | 4/2016 | Xu et al. |
| 2016/0142860 A1 | 5/2016 | Kim et al. |
| 2016/0156647 A1 | 6/2016 | Engel et al. |
| 2016/0165432 A1 | 6/2016 | Dubesset et al. |
| 2016/0183117 A1 | 6/2016 | Hsu et al. |
| 2016/0183178 A1 | 6/2016 | Marimuthu |
| 2016/0219043 A1 | 7/2016 | Blanke |
| 2016/0234119 A1 | 8/2016 | Zaidi et al. |
| 2016/0269566 A1 | 9/2016 | Gundamaraju et al. |
| 2016/0277243 A1 | 9/2016 | Kim et al. |
| 2016/0277530 A1 | 9/2016 | Jung et al. |
| 2016/0292687 A1 | 10/2016 | Kruglick |
| 2016/0337127 A1 | 11/2016 | Schultz et al. |
| 2016/0337841 A1 | 11/2016 | Won et al. |
| 2016/0337976 A1 | 11/2016 | Wang et al. |
| 2016/0365983 A1 | 12/2016 | Shahabuddin et al. |
| 2016/0381699 A1 | 12/2016 | Rubin et al. |
| 2017/0006431 A1 | 1/2017 | Donovan et al. |
| 2017/0041231 A1 | 2/2017 | Seed et al. |
| 2017/0093902 A1 | 3/2017 | Roundy et al. |
| 2017/0126512 A1 | 5/2017 | Seed et al. |
| 2017/0142547 A1* | 5/2017 | Hou .................... G06F 7/02 |
| 2017/0171235 A1 | 6/2017 | Mulchandani et al. |
| 2017/0201778 A1 | 7/2017 | Bailey et al. |
| 2017/0244670 A1 | 8/2017 | Maria |
| 2017/0244676 A1 | 8/2017 | Edwards |
| 2017/0245207 A1 | 8/2017 | Stammers et al. |
| 2017/0257866 A1 | 9/2017 | Chaudhuri et al. |
| 2017/0272921 A1 | 9/2017 | Kim et al. |
| 2017/0289048 A1 | 10/2017 | Chao et al. |
| 2017/0295201 A1 | 10/2017 | Peylo et al. |
| 2017/0295557 A1 | 10/2017 | Chamarty et al. |
| 2017/0318570 A1 | 11/2017 | Shaw et al. |
| 2017/0345006 A1 | 11/2017 | Kohli |
| 2017/0347283 A1 | 11/2017 | Kodaypak |
| 2017/0366499 A1* | 12/2017 | De Boer .................... H04L 51/58 |
| 2018/0020324 A1 | 1/2018 | Beauford |
| 2018/0035351 A1 | 2/2018 | Kodaypak |
| 2018/0070268 A1 | 3/2018 | Iwai et al. |
| 2018/0077714 A1 | 3/2018 | Kodaypak et al. |
| 2018/0092133 A1 | 3/2018 | Starsinic et al. |
| 2018/0109632 A1 | 4/2018 | Stammers et al. |
| 2018/0109941 A1 | 4/2018 | Jain et al. |
| 2018/0109953 A1 | 4/2018 | He |
| 2018/0115970 A1 | 4/2018 | Chae et al. |
| 2018/0124110 A1 | 5/2018 | Hunt et al. |
| 2018/0124544 A1 | 5/2018 | Gupta et al. |
| 2018/0167906 A1 | 6/2018 | Chellamani et al. |
| 2018/0192234 A1 | 7/2018 | Mohamed et al. |
| 2018/0205698 A1 | 7/2018 | Gupta et al. |
| 2018/0212710 A1 | 7/2018 | Ronneke et al. |
| 2018/0220301 A1 | 8/2018 | Gallagher et al. |
| 2018/0227322 A1 | 8/2018 | Luo et al. |
| 2018/0234291 A1 | 8/2018 | Mathison et al. |
| 2018/0241615 A1 | 8/2018 | Livanos et al. |
| 2018/0248711 A1 | 8/2018 | McCann |
| 2018/0249281 A1 | 8/2018 | McCann |
| 2018/0249282 A1 | 8/2018 | McCann |
| 2018/0262941 A1 | 9/2018 | Huang et al. |
| 2018/0263013 A1 | 9/2018 | Jain et al. |
| 2018/0270765 A1 | 9/2018 | Wang |
| 2018/0288127 A1 | 10/2018 | Zaidi et al. |
| 2018/0288198 A1 | 10/2018 | Pope et al. |
| 2018/0310162 A1 | 10/2018 | Kim et al. |
| 2018/0324671 A1 | 11/2018 | Palnati et al. |
| 2019/0007788 A1 | 1/2019 | Russell |
| 2019/0021121 A1 | 1/2019 | Aravamudhan et al. |
| 2019/0028337 A1 | 1/2019 | Ryu et al. |
| 2019/0037484 A1 | 1/2019 | Davies et al. |
| 2019/0044932 A1 | 2/2019 | Kumar et al. |
| 2019/0058962 A1 | 2/2019 | Aravamudhan et al. |
| 2019/0074982 A1 | 3/2019 | Hughes |
| 2019/0090086 A1 | 3/2019 | Graham et al. |
| 2019/0116624 A1 | 4/2019 | Tandon et al. |
| 2019/0141527 A1 | 5/2019 | Krishan |
| 2019/0182875 A1 | 6/2019 | Talebi Fard et al. |
| 2019/0238584 A1 | 8/2019 | Somasundaram et al. |
| 2019/0253885 A1 | 8/2019 | Bykampadi et al. |
| 2019/0274086 A1 | 9/2019 | Cui et al. |
| 2019/0306166 A1 | 10/2019 | Konda et al. |
| 2019/0342217 A1 | 11/2019 | Mazurek |
| 2019/0354709 A1 | 11/2019 | Brinskelle |
| 2019/0364064 A1 | 11/2019 | Gupta et al. |
| 2019/0364460 A1 | 11/2019 | Bogineni et al. |
| 2020/0007538 A1 | 1/2020 | Mehta |
| 2020/0021965 A1 | 1/2020 | McCann |
| 2020/0036754 A1 | 1/2020 | Livanos |
| 2020/0042799 A1 | 2/2020 | Huang et al. |
| 2020/0053044 A1 | 2/2020 | Mahalank et al. |
| 2020/0077260 A1 | 3/2020 | Hancock et al. |
| 2020/0077303 A1 | 3/2020 | Krishan et al. |
| 2020/0107291 A1 | 4/2020 | Nayak et al. |
| 2020/0128613 A1 | 4/2020 | Starsinic et al. |
| 2020/0145432 A1 | 5/2020 | Verma et al. |
| 2020/0169510 A1 | 5/2020 | Kadosh et al. |
| 2020/0187089 A1 | 6/2020 | Meredith et al. |
| 2020/0221541 A1 | 7/2020 | Yan |
| 2020/0259896 A1 | 8/2020 | Sachs et al. |
| 2020/0329363 A1 | 10/2020 | Mehta |
| 2020/0344576 A1 | 10/2020 | Li et al. |
| 2020/0344604 A1 | 10/2020 | He et al. |
| 2020/0359218 A1 | 11/2020 | Lee et al. |
| 2020/0404490 A1 | 12/2020 | Thai et al. |
| 2021/0022070 A1 | 1/2021 | Letor et al. |
| 2021/0084582 A1 | 3/2021 | Li |
| 2021/0111985 A1 | 4/2021 | Mahalank et al. |
| 2021/0112012 A1 | 4/2021 | Krishan et al. |
| 2021/0142143 A1 | 5/2021 | Howard et al. |
| 2021/0152494 A1 | 5/2021 | Johnsen et al. |
| 2021/0168751 A1 | 6/2021 | Stojanovski et al. |
| 2021/0176177 A1 | 6/2021 | Kubo et al. |
| 2021/0194903 A1 | 6/2021 | Medvedovsky et al. |
| 2021/0203636 A1 | 7/2021 | Kumar et al. |
| 2021/0203643 A1 | 7/2021 | Jost et al. |
| 2021/0211946 A1 | 7/2021 | Li |
| 2021/0234706 A1 | 7/2021 | Nair et al. |

(56) References Cited

U.S. PATENT DOCUMENTS

| | | |
|---|---|---|
| 2021/0234934 A1 | 7/2021 | Xia |
| 2021/0243165 A1 | 8/2021 | Bykampadi et al. |
| 2021/0250186 A1 | 8/2021 | Bykampadi et al. |
| 2021/0250785 A1 | 8/2021 | Ortenblad et al. |
| 2021/0258824 A1 | 8/2021 | John et al. |
| 2021/0274436 A1 | 9/2021 | Sun et al. |
| 2021/0297935 A1 | 9/2021 | Belling et al. |
| 2021/0297942 A1 | 9/2021 | Bykampadi et al. |
| 2021/0321303 A1 | 10/2021 | Nair et al. |
| 2021/0377138 A1 | 12/2021 | Sun et al. |
| 2021/0377212 A1 | 12/2021 | Holtmanns et al. |
| 2021/0399988 A1 | 12/2021 | Labonte |
| 2021/0400538 A1 | 12/2021 | Ke |
| 2021/0406038 A1 | 12/2021 | Fetzer et al. |
| 2022/0021586 A1 | 1/2022 | Kazmierski |
| 2022/0022024 A1 | 1/2022 | Aravind et al. |
| 2022/0022027 A1 | 1/2022 | Xin et al. |
| 2022/0022040 A1 | 1/2022 | Mahalank et al. |
| 2022/0030413 A1 | 1/2022 | Ben Henda et al. |
| 2022/0038394 A1 | 2/2022 | Anubolu et al. |
| 2022/0052847 A1 | 2/2022 | Gonzalez Cervantes et al. |
| 2022/0070674 A1 | 3/2022 | Russell |
| 2022/0104020 A1 | 3/2022 | Rajput |
| 2022/0104112 A1 | 3/2022 | Rajput |
| 2022/0124079 A1 | 4/2022 | Patil et al. |
| 2022/0124479 A1 | 4/2022 | Iddya |
| 2022/0124501 A1 | 4/2022 | Bykampadi et al. |
| 2022/0150212 A1 | 5/2022 | Rajput |
| 2022/0158847 A1 | 5/2022 | Aggarwal et al. |
| 2022/0159445 A1 | 5/2022 | Rajavelu |
| 2022/0174544 A1 | 6/2022 | Taft et al. |
| 2022/0182923 A1 | 6/2022 | Yao et al. |
| 2022/0191694 A1 | 6/2022 | Rajput |
| 2022/0191763 A1 | 6/2022 | Roeland et al. |
| 2022/0200951 A1 | 6/2022 | Goel |
| 2022/0200966 A1 | 6/2022 | De-Gregorio-Rodriguez et al. |
| 2022/0201489 A1 | 6/2022 | Mahalank |
| 2022/0240084 A1* | 7/2022 | Speidel .................. H04W 8/04 |
| 2022/0272069 A1 | 8/2022 | Verma et al. |
| 2022/0272541 A1 | 8/2022 | Rajput et al. |
| 2022/0369091 A1 | 11/2022 | Nair et al. |
| 2022/0386225 A1 | 12/2022 | Sapra et al. |

FOREIGN PATENT DOCUMENTS

| | | |
|---|---|---|
| CN | 101742445 A | 6/2010 |
| CN | 101917698 A | 12/2010 |
| CN | 102656845 A | 9/2012 |
| CN | 102883464 A | 1/2013 |
| CN | 103179504 A | 6/2013 |
| CN | 103298110 A | 9/2013 |
| CN | 103444212 A | 12/2013 |
| CN | 105306519 A | 2/2016 |
| CN | 105592533 A | 5/2016 |
| CN | 106664516 A | 5/2017 |
| CN | 107800664 A | 3/2018 |
| CN | 110035433 A | 7/2019 |
| CN | 110800322 B | 5/2021 |
| CN | 110352604 B | 3/2022 |
| CN | ZL201880040478.3 | 4/2022 |
| CN | 11295867 B | 7/2022 |
| CN | ZL 201880014277.6 | 8/2022 |
| CN | ZL 201880014297.3 | 9/2022 |
| CN | ZL202080007649.X | 9/2022 |
| EP | 1 067 492 A2 | 1/2001 |
| EP | 1 380 183 B1 | 9/2004 |
| EP | 1 906 682 A1 | 4/2008 |
| EP | 2 204 955 A1 | 7/2010 |
| EP | 3 018 946 A1 | 5/2016 |
| EP | 2 785 125 B1 | 8/2018 |
| EP | 3 493 569 A1 | 6/2019 |
| EP | 3 646 630 B1 | 8/2021 |
| EP | 3 653 016 B1 | 8/2021 |
| EP | 3 662 630 | 8/2021 |
| EP | 3 586 528 B1 | 12/2021 |
| EP | 3 586 530 B1 | 1/2022 |
| EP | 3954146 A1 | 2/2022 |
| EP | 3821630 B1 | 7/2022 |
| ES | 2 548 005 T3 | 10/2015 |
| GB | 2503973 A | 1/2014 |
| IN | 401247 | 7/2018 |
| JP | 2008-053808 A | 3/2008 |
| JP | 2010-183542 A | 8/2010 |
| JP | 2015-073184 A | 4/2015 |
| JP | 2017-168270 | 9/2017 |
| JP | 7038148 B2 | 3/2022 |
| JP | 7082983 B2 | 6/2022 |
| JP | 7100649 | 7/2022 |
| JP | 7113147 B | 8/2022 |
| JP | 7132931 B | 8/2022 |
| JP | 7133010 | 8/2022 |
| JP | 7133010 B2 | 9/2022 |
| JP | 2020/501192 | 10/2022 |
| KR | 10-2003-0000491 | 1/2003 |
| KR | 10-2008-0006225 | 1/2008 |
| WO | WO 2001/88790 A1 | 11/2001 |
| WO | WO 2005/091656 A1 | 9/2005 |
| WO | WO 2005/101872 A1 | 10/2005 |
| WO | WO 2007/084503 A2 | 7/2007 |
| WO | WO 2008/053808 A1 | 5/2008 |
| WO | WO-2010/021886 A1 | 2/2010 |
| WO | WO 2010/045646 A2 | 4/2010 |
| WO | WO 2010/105043 A2 | 9/2010 |
| WO | WO 2010/105099 A2 | 9/2010 |
| WO | WO 2011/010640 A1 | 1/2011 |
| WO | WO 2011/047382 A2 | 4/2011 |
| WO | WO 2016/007494 A1 | 1/2016 |
| WO | WO 2016/156549 A1 | 10/2016 |
| WO | WO 2016/200357 A1 | 12/2016 |
| WO | WO 2016/201990 A1 | 12/2016 |
| WO | WO 2017/004158 A1 | 1/2017 |
| WO | WO 2017/017879 A1 | 2/2017 |
| WO | WO 2017/082532 A1 | 5/2017 |
| WO | WO 2018/156318 A1 | 8/2018 |
| WO | WO 2018/156319 A1 | 8/2018 |
| WO | WO 2018/156320 A1 | 8/2018 |
| WO | WO 2018/202284 A1 | 11/2018 |
| WO | WO 2019/005287 A1 | 1/2019 |
| WO | WO 2019/014505 A1 | 1/2019 |
| WO | WO 2019/027813 A1 | 2/2019 |
| WO | WO 2019/090270 A1 | 5/2019 |
| WO | WO 2019/224157 A1 | 11/2019 |
| WO | WO 2020/013889 A1 | 1/2020 |
| WO | WO 2020/033113 A1 | 2/2020 |
| WO | WO 2020/036883 A1 | 2/2020 |
| WO | WO 2008/053808 A1 | 5/2020 |
| WO | WO 2020/164763 A1 | 8/2020 |
| WO | WO 2020/174121 A1 | 9/2020 |
| WO | WO 2020/179665 A1 | 9/2020 |
| WO | WO 2020/210015 A1 | 10/2020 |
| WO | WO 2020/221956 A1 | 11/2020 |
| WO | WO 2020/249242 A1 | 12/2020 |
| WO | WO 2020/257018 A1 | 12/2020 |
| WO | WO 2021/047551 A1 | 3/2021 |
| WO | WO 2021/138072 A1 | 7/2021 |
| WO | WO 2022/015378 A1 | 1/2022 |
| WO | WO 2022/046176 A1 | 3/2022 |
| WO | WO 2022/066227 | 3/2022 |
| WO | WO 2022/066228 A1 | 3/2022 |
| WO | WO 2022/086596 A1 | 4/2022 |
| WO | WO 2022/098404 A1 | 5/2022 |
| WO | WO 2022/103454 A1 | 5/2022 |
| WO | WO 2022/132315 A1 | 6/2022 |
| WO | WO 2022/132316 A1 | 6/2022 |
| WO | WO 2022/182448 A1 | 9/2022 |
| WO | WO 2022/240582 A1 | 11/2022 |

OTHER PUBLICATIONS

International Search Report for International Patent Application Serial No. PCT/US2020/065763 (dated Apr. 6, 2021).
First Examination Report for Indian Patent Application Serial No. 201947047367 (dated Mar. 31, 2021).

(56) References Cited

OTHER PUBLICATIONS

Notice of Allowance for Chinese Patent Application Serial No. 201880040477.9 (dated Mar. 29, 2021).
Communication under Rule 71 (3) EPC Intention to Grant for European Patent Application Serial No. 18 731 923.1 (dated Mar. 22, 2021).
First Examination Report for Indian Patent Application Serial No. 201947047012 (dated Mar. 18, 2021).
Commonly-assigned, co-pending U.S. Appl. No. 17/185,934 for "Methods, Systems, and Computer Readable Media for Mitigating Location Tracking and Denial of Service (DoS) Attacks that Utilize Access and Mobility Management Function (AMF) Location Service," (Unpublished, filed Feb. 25, 2021).
Communication under Rule 71(3) EPC Intention to grant for European Application Serial No. 18 756 018.0 (dated Feb. 24, 2021).
"3rd Generation Partnership Project; Technical Specification Group Services and System Aspects; Service requirements for the 5G system; Stage 1 (Release 18)," 3GPP TS 22.261, V18.1.1, pp. 1-85 (Jan. 2021).
"3rd Generation Partnership Project; Technical Specification Group Services and System Aspects; Procedures for the 5G System (5GS); Stage 2 (Release 16)," 3GPP TS 23.502, V16.7.1, pp. 1-603 (Jan. 2021).
Fajardo, V. et al., "Diameter Base Protocol, Internet Engineering Task Force (IETF)," RFC 6733, pp. 1-152 (Oct. 2012).
"3rd Generation Partnership Project; Technical Specification Group Core Network and Terminals; Numbering, addressing and identification; (Release 17)," 3GPP TS 23.003, V17.0.0, pp. 1-142 (Dec. 2020).
"3rd Generation Partnership Project; Technical Specification Group Services and System Aspects; Wireless and wireline convergence access support for the 5G System (5GS) (Release 16)," 3GPP TS 23.316, V16.6.0, pp. 1-83 (Dec. 2020).
"3rd Generation Partnership Project; Technical Specification Group Services and System Aspects; Security architecture and procedures for 5G system (Release 17)," 3GPP TS 33.501, V17.0.0, pp. 1-253 (Dec. 2020).
"3rd Generation Partnership Project; Technical Specification Group Core Network and Terminals; 5G System; Common Data Types for Service Based Interfaces; Stage 3 (Release 17)," 3GPP TS 29.571, V17.0.0, pp. 1-128 (Dec. 2020).
"3rd Generation Partnership Project; Technical Specification Group Core Network and Terminals; 5G System; Public Land Mobile Network (PLMN) Interconnection; Stage 3 (Release 16)," 3GPP TS 29.573, V16.5.0, pp. 1-98 (Dec. 2020).
"3rd Generation Partnership Project; Technical Specification Group Core Network and Terminals; 5G System; Location Management Services; Stage 3 (Release 16)," 3GPP TS 29.572, V16.5.0, pp. 1-77 (Dec. 2020).
"3rd Generation Partnership Project; Technical Specification Group Core Network and Terminals; 5G System; Access and Mobility Management Services; Stage 3 (Release 17)," 3GPP TS 29.518, V17.0.0, pp. 1-298 (Dec. 2020).
"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).
Commonly-assigned, co-pending U.S. Appl. No. 17/129,441 for "Methods, Systems, and Computer Readable Media for Mitigating Spoofing Attacks on Security Edge Protection Proxy (SEPP) Inter-Public Land Mobile Network (INTER-PLMN) Forwarding Interface," (Unpublished, filed Dec. 21, 2020).
Commonly-assigned, co-pending U.S. Appl. No. 17/129,487 for "Methods, Systems, and Computer Readable Media for Ingress Message Rate Limiting," (Unpublished, filed Dec. 21, 2020).
Commonly-assigned, co-pending U.S. Appl. No. 17/125,943 for "Methods, Systems, and Computer Readable Media for Mitigating 5G Roaming Attacks for Internet of Things (IoT) Devices Based on Expected User Equipment (UE) Behavior Patterns," (Unpublished, filed Dec. 17, 2020).
Commonly-assigned, co-pending U.S. Appl. No. 17/123,038 for "Methods, Systems, and Computer Readable Media for Message Validation in Fifth Generation (5G) Communications Networks," (Unpublished, filed Dec. 15, 2020).
"3rd Generation Partnership Project; Technical Specification Group Core Network and Terminals; 5G System; Network Function Repository Services; Stage 3 (Release 17)," 3GPP TS 29.510, V17.0.0, pp. 1-229 (Dec. 2020).
Commonly-assigned, co-pending U.S. Appl. No. 17/099,683 for "Methods, Systems, and Computer Readable Media for Validating Location Update Messages," (Unpublished, filed Nov. 16, 2020).
Commonly-assigned, co-pending U.S. Appl. No. 17/095,420 for "Methods, Systems, and Computer Readable Media for Mitigating 5G Roaming Spoofing Attacks," (Unpublished, filed Nov. 11, 2020).
Notice of Allowance and Fee(s) Due and Examiner-Initiated Interview Summary for U.S. Appl. No. 16/379,488 (dated Oct. 23, 2020).
Commonly-assigned, co-pending U.S. Appl. No. 17/076,482 for "Methods, Systems, and Computer Readable Media for Validating a Session Management Function (SMF) Registration Request," (Unpublished, filed Oct. 21, 2020).
Notice of Allowance and Fee(s) Due and Examiner-Initiated Interview Summary for U.S. Appl. No. 16/024,422 (dated Oct. 21, 2020).
"3rd Generation Partnership Project; Technical Specification Group Services and System Aspects; Security architecture and procedures for 5G system (Release 16)," 3GPP TS 33.501, V16.4.0, pp. 1-249 (Sep. 2020).
"3rd Generation Partnership Project; Technical Specification Group Core Network and Terminals; 5G System; Public Land Mobile Network (PLMN) Interconnection; Stage 3 (Release 16)," 3GPP TS 29.573, V16.4.0, pp. 1-95 (Sep. 2020).
"3rd Generation Partnership Project; Technical Specification Group Core Network and Terminals; 5G System; Authentication Server Services; Stage 3 (Release 16)," 3GPP TS 29.509, V16.5.0 pp. 1-60 (Sep. 2020).
"3rd Generation Partnership Project; Technical Specification Group Core Network and Terminals; 5G System; Network Function Repository Services; Stage 3 (Release 16)," 3GPP TS 29.510, V16.5.0, pp. 1-208 (Sep. 2020).
"3rd Generation Partnership Project; Technical Specification Group Core Network and Terminals; Numbering, addressing and identification; (Release 16)," 3GPP TS 23.003, V16.4.0, pp. 1-141 (Sep. 2020).
"3rd Generation Partnership Project; Technical Specification Group Core Network and Terminals; 5G System; Session Management Services; Stage 3 (Release 16)," 3GPP TS 29.502, V16.5.0, pp. 1-260 (Sep. 2020).
"3rd Generation Partnership Project; Technical Specification Group Services and System Aspects; System architecture for the 5G System (5GS); Stage 2 (Release 16)," 3GPP TS 23.501, V16.6.0, pp. 1-447 (Sep. 2020).
3rd Generation Partnership Project; Technical Specification Group Services and System Aspects; Procedures for the 5G System (5GS); Stage 2 (Release 16), 3GPP TS 23.502, V16.6.0, pp. 1-597 (Sep. 2020).
Notice of Allowance and Fee(s) Due and Examiner-Initiated Interview Summary for U.S. Appl. No. 16/100,172 (dated Sep. 14, 2020).
Commonly-assigned, co-pending U.S. Appl. No. 17/008,528 for "Methods, Systems, and Computer Readable Media for 5G User Equipment (UE) Historical Mobility Tracking and Security Screening Using Mobility Patterns," (Unpublished, filed Aug. 31, 2020).
First Office Action for Chinese Application Serial No. 201880040477.9 (dated Aug. 5, 2020).
"3rd Generation Partnership Project; Technical Specification Group Services and System Aspects; System architecture for the 5G System (5GS); Stage 2 (Release 16)," 3GPP TS 23.501 V16.5.1, pp. 1-440 (Aug. 2020).

(56) References Cited

OTHER PUBLICATIONS

"3rd Generation Partnership Project; Technical Specification Group Core Network and Terminals; 5G System; Network Function Repository Services; Stage 3 (Release 16)," 3GPP TS 29.510, V16.4.0, pp. 1-206 (Jul. 2020).

Notification of Transmittal of the International Search Report and the Written Opinion of the International Searching Authority, or the Declaration for International Application No. PCT/US2020/024234 (dated Jul. 16, 2020).

Non-Final Office Action for U.S. Appl. No. 16/379,488 (dated Jul. 15, 2020).

Commonly-assigned, co-pending U.S. Appl. No. 16/929,048 for "Methods, Systems, and Computer Readable Media for Mitigating 5G Roaming Security Attacks Using Security Edge Protection Proxy (SEPP)," (Unpublished, filed Jul. 14, 2020).

"3rd Generation Partnership Project; Technical Specification Group Services and System Aspects; Architecture enhancements for 5G System (5GS) to support network data analytics services (Release 16)," 3GPP TS 23.288 V16.4.0, pp. 1-66 (Jul. 2020).

"3rd Generation Partnership Project; Technical Specification Group Core Network and Terminals; 5G System; Public Land Mobile Network (PLMN) Interconnection; Stage 3 (Release 16)," 3GPP TS 29.573, V16.3.0, pp. 1-86 (Jul. 2020).

"3rd Generation Partnership Project; Technical Specification Group Services and System Aspects; Security architecture and procedures for 5G system (Release 16)," 3GPP TS 33.501, V16.3.0, pp. 1-248 (Jul. 2020).

Non-Final Office Action for U.S. Appl. No. 16/024,422 (dated Jul. 8, 2020).

"3rd Generation Partnership Project; Technical Specification Group Core Network and Terminals; 5G System; Network Function Repository Services; Stage 3 (Release 16)," 3GPP TS 29.510, V16.4.0, pp. 1-192 (Jul. 2020).

Applicant-Initiated Interview Summary for U.S. Appl. No. 16/100,172 (dated Jun. 9, 2020).

"3rd Generation Partnership Project; Technical Specification Group Core Network and Terminals; 5G System; Technical Realization of Service Based Architecture; Stage 3 (Release 16)," 3GPP TS 29.500 V16.4.0, pp. 1-79 (Jun. 2020).

"3rd Generation Partnership Project; Technical Specification Group Core Network and Terminals; 5G System; Network Data Analytics Services; Stage 3 (Release 16)," 3GPP TS 29.520 V16.4.0, pp. 1-91 (Jun. 2020).

Communication of European publication number and information on the application of Article 67(3) EPC for European Application Serial No. 18756018.0 (dated May 13, 2020).

Communication of European publication number and information on the application of Article 67(3) EPC for European Application Serial No. 18731923.1 (dated Apr. 8, 2020).

"3rd Generation Partnership Project; Technical Specification Group Services and System Aspects; Security architecture and procedures for 5G system (Release 16)," 3GPP TS 33.501, V16.2.0, pp. 1-227 (Mar. 2020).

"3rd Generation Partnership Project; Technical Specification Group Services and System Aspects; Procedures for the 5G System (5GS); Stage 2 (Release 16)," 3GPP TS 23.502, V16.4.0, pp. 1-582 (Mar. 2020).

Non-Final Office Action for U.S. Appl. No. 16/100,172 (dated Mar. 6, 2020).

Notice of Allowance and Fee(s) Due and Examiner-Initiated Interview Summary for U.S. Appl. No. 15/666,300 (dated Feb. 13, 2020).

Commonly-assigned, co-pending U.S. Appl. No. 16/732,098 for "Methods, Systems, and Computer Readable Media for Implementing Indirect General Packet Radio Service (GPRS) Tunneling Protocol (GTP) Firewall Filtering Using Diameter Agent and Signal Transfer Point (STP)," (Unpublished, filed Dec. 31, 2019).

Advisory Action and Applicant-Initiated Interview Summary for U.S. Appl. No. 16/100,172 (dated Dec. 20, 2019).

"3rd Generation Partnership Project; Technical Specification Group Services and System Aspects; 5G Security Assurance Specification (SCAS) for the Security Edge Protection Proxy (SEPP) network product class (Release 16)," 3GPP TS 33.517, V.16.1.0, pp. 1-17 (Dec. 2019).

3rd Generation Partnership Project; Technical Specification Group Core Network and Terminals; T8 reference point for Northbound APIs, (Release 15), 3GPP TS 29.122, V15.6.0, pp. 1-300 (Dec. 2019).

"FS.19 Diameter Interconnect Security," GSMA, pp. 1-3 (Dec. 20, 2019).

Notification of Transmittal of the International Search Report and the Written Opinion of the International Searching Authority, or the Declaration for International Application Serial No. PCT/US2019/042203 (dated Nov. 11, 2019).

Applicant-Initiated Interview Summary for U.S. Appl. No. 15/666,300 (dated Oct. 29, 2019).

Final Office Action for U.S. Appl. No. 16/100,172 (dated Oct. 3, 2019).

"Technical Specification Group Core Network and Terminals; Evolved Packet System (EPS); Mobility Management Entity (MME) and Serving GPRS Support Node (SGSN) related interfaces based on Diameter protocol (Release 16)," 3GPP TS 29.272, V16.0.0, pp. 1-180 (Sep. 2019).

"Technical Specification Group Core Network and Terminals; Policy and Charging Control (PCC); Reference points (Release 16)," 3GPP TS 29.212, V16.1.0, pp. 1-285 (Sep. 2019).

Notification of Transmittal of the International Search Report and the Written Opinion of the International Searching Authority, or the Declaration for International Application Serial No. PCT/US2019/028814 (dated Aug. 20, 2019).

Applicant-Initiated Interview Summary for U.S. Appl. No. 16/100,172 (dated Jul. 18, 2019).

Notice of Allowance and Fee(s) Due and Examiner-Initiated Interview Summary for U.S. Appl. No. 15/376,631 (dated Jul. 2, 2019).

"Technical Specification Group Core Network and Terminals; Mobile Application Part (MAP) specification (Release 15)," 3GPP TS 29.002, V15.5.0, pp. 1-1024 (Jun. 2019).

Non-Final Office Action for U.S. Appl. No. 15/666,300 (dated Jun. 27, 2019).

Decision on Appeal for U.S. Appl. No. 13/047,287 (dated Jun. 18, 2019).

Notification of Transmittal of the International Search Report and the Written Opinion of the International Searching Authority, or the Declaration for International Patent Application No. PCT/US2019/018990 (dated May 8, 2019).

Commonly-assigned, co-pending U.S. Appl. No. 16/379,488 for "Methods, Systems, and Computer Readable Media for Dynamically Learning and Using Foreign Telecommunications Network Mobility Management Node Information for Security Screening," (Unpublished, filed Apr. 9, 2019).

Non-Final Office Action for U.S. Appl. No. 16/100,172 (dated Apr. 11, 2019).

Notice of Allowability for U.S. Appl. No. 16/035,008 (dated Mar. 18, 2019).

Notice of Allowance and Fee(s) Due for U.S. Appl. No. 16/035,008 (dated Jan. 18, 2019).

Advisory Action Before the Filing of an Appeal Brief and AFCP 2.0 Decision for U.S. Appl. No. 15/376,631 (dated Dec. 19, 2018).

Notice of Allowance and Fee(s) Due and Applicant-Initiated Interview Summary for U.S. Appl. No. 15/408,155 (dated Oct. 31, 2018).

Sahu et al., "How 5G Registration Works," http://5gblogs.com/5g-registration/, 10 pages (Oct. 12, 2018).

Notification of Transmittal of the International Search Report and the Written Opinion of the International Searching Authority, or the Declaration for International Patent Application No. PCT/US2018/043985 (dated Oct. 9, 2018).

Final Office Action for U.S. Appl. No. 15/376,631 (dated Oct. 5, 2018).

Notice of Allowance and Fee(s) Due for U.S. Appl. No. 15/636,118 (dated Oct. 3, 2018).

(56) References Cited

OTHER PUBLICATIONS

Notification of Transmittal of the International Search Report and the Written Opinion of the International Searching Authority, or the Declaration for International Application No. PCT/US2018/030319 (dated Aug. 20, 2018).
Commonly-assigned, co-pending U.S. Appl. No. 16/100,172 for "Methods, Systems, and Computer Readable Media for Conducting a Time Distance Security Countermeasure for Outbound Roaming Subscribers Using Diameter Edge Agent," (Unpublished, filed Aug. 9, 2018).
Final Office Action for U.S. Appl. No. 15/408,155 (dated Jul. 26, 2018).
Commonly-assigned, co-pending U.S. Appl. No. 16/035,008 for "Methods, Systems, and Computer Readable Media for Validating a Visitor Location Register (VLR) Using a Signaling System No. 7 (SS7) Signal Transfer Point (STP)," (Unpublished, filed Jul. 13, 2018).
Commonly-assigned, co-pending U.S. Appl. No. 16/024,422 for "Methods, Systems, and Computer Readable Media for Network Node Validation," (Unpublished, filed Jun. 29, 2018).
Notice of Allowance and Fee(s) Due for U.S. Appl. No. 15/636,118 (dated Apr. 27, 2018).
Non-Final Office Action for U.S. Appl. No. 15/376,631 (dated Apr. 18, 2018).
"Signalling Security in Telecom SS7/Diameter/5G," Enisa, pp. 1-30 (Mar. 2018).
Examiner's Answer for U.S. Appl. No. 13/047,287 (dated Feb. 26, 2018).
Advisory Action Before the Filing of an Appeal Brief and AFCP 2.0 Decision for U.S. Appl. No. 15/376,631 (dated Feb. 2, 2018).
Non-Final Office Action for U.S. Appl. No. 15/408,155 (dated Jan. 9, 2018).
Final Office Action for U.S. Appl. No. 15/376,631 (dated Nov. 28, 2017).
"GSMA Guidelines for Diameter Firewall," NetNumber Inc., pp. 1-7 (Sep. 12, 2017).
Commonly-assigned, co-pending U.S. Appl. No. 15/666,300 for "Methods, Systems, and Computer Readable Media for Mobility Management Entity (MME) Authentication for Outbound Roaming Subscribers Using Diameter Edge Agent (DEA)," (Unpublished, filed Aug. 1, 2017).
"Oracle Communications Diameter Signaling Router Main Differentiators," Oracle White Paper, pp. 1-10 (Jul. 2017).
"LTE and EPC Roaming Guidelines," GSM Association, Official Document IR.88, V 16.0, pp. 1-90 (Jul. 5, 2017).
Commonly-assigned, co-pending U.S. Appl. No. 15/636,118 for "Methods, Systems, and Computer Readable Media for Validating User Equipment (UE) Location," (Unpublished, filed Jun. 28, 2017).
Non-Final Office Action for U.S. Appl. No. 15/376,631 (dated Jun. 16, 2017).
"LTE International Roaming Whitepaper," http://carrier.huawei.com/en/technical-topics/core-network/lte-roaming-whitepaper, pp. 1-16 (Downloaded May 12, 2017).
"Digital cellular telecommunications system (Phase 2+) (GSM); Universal Mobile Telecommunications System (UMTS); Universal Geographical Area Description (GAD) (3GPP TS 23.032 V 14.0.0 Release 14)," ETSI TS 123 032 V14.0.0, pp. 1-30 (May 2017).
Final Office Action for U.S. Appl. No. 13/047,287 (dated Mar. 10, 2017).
"3rd Generation Partnership Project; Technical Specification Group Services and System Aspects; Functional stage 2 description of Location Services (LCS) (Release 14)," 3GPP TS 23.271 V14.1.0, pp. 1-181 (Mar. 2017).
Commonly-assigned, co-pending U.S. Appl. No. 15/408,155 for "Methods, Systems, and Computer Readable Media for Validating a Redirect Address in a Diameter Message," (Unpublished, filed Jan. 17, 2017).
"Digital cellular telecommunications system (Phase 2+) (GSM); Universal Mobile Telecommunications System (UMTS); LTE; Cx and Dx interfaces based on the Diameter protocol; Protocol details (3GPP TS 29.229 V 13.1.0 Release 13)," ETSI TS 129 229 V13.1.0, pp. 1-42 (Jan. 2017).
"Edge Router (DEA)," http://www.mavenir.com/our-products/mobile/edge-router-dea, pp. 1-7 (Copyright 2017).
Commonly-assigned, co-pending U.S. Appl. No. 15/376,631 for "Methods, Systems, and Computer Readable Media for Validating Subscriber Location Information," (Unpublished, filed Dec. 12, 2016).
Non-Final Office Action for U.S. Appl. No. 13/047,287 (dated Aug. 25, 2016).
"Digital cellular telecommunications system (Phase 2+); Universal Mobile Telecommunications System (UMTS); Numbering, addressing and identification (3GPP TS 23.003 V 12.9.0 Release 12)," ETSI TS 1 23 003 V12.9.0, pp. 1-93 (Mar. 2016).
"Syniverse Guide to LTE Roaming and Interoperability," https://www.syniverse.com/assets/files/custom_content/lte-roaming-interoperability-guide.pdf, pp. 1-11 (Jan. 8, 2016).
"Digital cellular telecommunications system (Phase 2+) (GSM); Universal Mobile Telecommunications System (UMTS); LTE; Location Services (LCS); LCS Application Protocol (LCS-AP) between the Mobile Management Entity (MME) and Evolved Serving Mobile Location Centre (E-SMLC); SLs interface (3GPP TS 29.171 V 11.4.0 Release 11)," ETSI TS 129 171 V11.4.0, pp. 1-52 (Jan. 2016).
"Diameter Signaling Control (DSC)," https://www.extent.com/diameter-signaling-control-dsc/, pp. 1-3 (Copyright 2016).
Kotte, "Analysis and Experimental Verification of Diameter Attacks in Long Term Evolution Networks," http://www.diva-portal.org/smash/get/diva2:951619/FULLTEXT01.pdf, pp. 1-72 (2016).
Advisory Action Before the Filing of an Appeal Brief for U.S. Appl. No. 13/047,287 (dated Oct. 16, 2015).
"The Dialogic® Helix™ Signaling Controller," https://www.dialogic.com/-/media/products/docs/brochures/14090-helix-br.pdf, pp. 1-5 (Aug. 2015).
Final Office Action for U.S. Appl. No. 13/047,287 (dated Jun. 4, 2015).
DeKok, "The Network Access Identifier," Internet Engineering Task Force (IETF), RFC 7542, pp. 1-30 (May 2015).
"Digitial cellular telecommunications system (Phase 2+); Universal Mobile Telecommunications System (UMTS); LTE; Location Services (LCS); Evolved Packet Core (EPC) LCS Protocol (ELP) between the Gateway Mobile Location Centre (GMLC) and the Mobile Management Entity (MME); SLg interface (3GPP TS 29.172 version 9.6.0 Release 9),"ETSI TS 129 172, V9.6.0, pp. 1-27 (Apr. 2015).
"Digital cellular telecommunications system (Phase 2+); Universal Mobile Telecommunications System (UMTS); LTE; Location Services (LCS); Diameter-based SLh interface for Control Plane LCS (3GPP TS 29.173 version 12.2.0 Release 12)," ETSI TS 129 173, V12.2.0., p. 1-20 (Oct. 2014).
Non-Final Office Action for U.S. Appl. No. 13/047,287 (dated Sep. 25, 2014).
Supplemental Notice of Allowance and Fee(s) Due for U.S. Appl. No. 12/823,559 (dated Aug. 23, 2013).
Notice of Allowance and Fee(s) Due for U.S. Appl. No. 12/823,559 (dated Aug. 1, 2013).
Email to U.S. Patent and Trademark Office dated Jun. 28, 2013.
Final Office Action for U.S. Appl. No. 12/823,559 (dated Apr. 11, 2013).
Final Office Action for U.S. Appl. No. 13/047,287 (dated Jan. 31, 2013).
Non-Final Office Action for U.S. Appl. No. 12/823,559 (dated Nov. 14, 2012).
"Digital cellular telecommunications system (Phase 2+); Universal Monile Telecommunications System (UMTS); LTE; Location Services (LCS); Service description; Stage1 (3GPP TS 22.071 V 11.0.0 Release 11," ETSI TS 122 071 V11.0.0, pp. 1-50 (Oct. 2012).
Restriction and/or Election Requirement for U.S. Appl. No. 12/823,559 (dated Aug. 27, 2012).
Notice of Allowance and Fee(s) due for U.S. Appl. No. 12/581,739 (dated Aug. 8, 2012).

(56) References Cited

OTHER PUBLICATIONS

Non-Final Office Action for U.S. Appl. No. 13/047,287 (dated Jun. 6, 2012).
Notice of Allowance and Fee(s) Due and Examiner-Initiated Interview Summary for U.S. Appl. No. 12/581,739 (dated May 15, 2012).
Non-Final Office Action for U.S. Appl. No. 12/722,460 (dated Apr. 9, 2012).
"3rd Generation Partnership Project; Technical Specification Group Services and System Aspects; Telecommunication management; Charging management; Diameter charging applications (Release 11)," 3GPP TS 32.299, V11.3.0, pp. 1-150 (Mar. 2012).
"Net-Net Diameter Director," http://www.oracle.com/us/industries/communications/net-net-diameter-director-ds-1985034.pdf, pp. 1-9 (Copyright 2012).
Final Office Action for U.S. Appl. No. 12/581,739 (dated Dec. 30, 2011).
"3rd Generation Partnership Project; Technical Specification Group Core Network and Terminals; Policy and Charging Control (PCC) over Gx/Sd reference point (Release 11)," 3GPP TS 29.212, V11.3.0, pp. 1-171 (Dec. 2011).
Non-Final Office Action for U.S. Appl. No. 12/581,739 (dated Aug. 26, 2011).
Press Release, "SmartSynch SmartMeters Communicate Using the Largest and Most Available Wireless Networks in the World," http://www.smartsynch.com/SmartSynch_gprs.htm, pp. 1-2 (Downloaded from the Internet on Jul. 5, 2011).
"Solution: Itron Centron GPRS," Data Sheet, http://www.smartsynch.com/SmartSynch_itron_centron.htm, pp. 1-3 (Downloaded from the Internet on Jul. 5, 2011).
Commonly-assigned, co-pending U.S. Appl. No. 13/047,287 (Unpublished, filed on Mar. 14, 2011).
Myers, "SmartSynch Introduces Innovative 'DCX' Smart Grid Solution at DistribuTECH," SmartSynch News, http://www.appmesh.com/news/020309.htm, pp. 1-3 Feb. 3, 2009 (Downloaded from the Internet on Jul. 5, 2011).
"NES System Architecture," Data Sheet, Copyright 2009, pp. 1-2 (Downloaded from the Internet on Jul. 5, 2011).
"Wireless M-Bus and ZigBee®-enabled GSM/GPRS/ EDG Gateway for Smart Metering Introduced," Metering.com, http://www.metering.com/node/13550 Sep. 19, 2008, pp. 1-2 (Downloaded from the Internet on Jul. 5, 2011).
Notification of Transmittal of the Internatioanl Search Report and the Written Opinion of the International Searching Authority, or the Declaration for International Application No. PCT/US2010/027043 (dated Oct. 19, 2010).
"Draft LS on network verification of UE provided location," 3GPP TSG SA WG2 Meeting #81, pp. 1 (Oct. 11-15, 2010).
Notification of Transmittal of the International Search Report and the Written Opinion of the International Searching Authority, or the Declaration for International Application No. PCT/US2009/061187 (dated May 17, 2010).
Press Release, "Echelon and T-Mobile Announce Alliance to Reduce the Cost of a Secure Smart Grid Network for Utilities," Echelon Corp., http://www.3gamericas.org/index.cfm?fuseaction=pressreleasedisplay&pressreleaseid=2201, pp. 1-3 (Apr. 23, 2009).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272, V8.1.1, pp. 1-57 (Jan. 2009).
"3rd Generation Partnership Project; Technical Specification Group Core Network; Unstructured Supplementary Service Data (USSD); Stage 2 (Release 8)," 3GPP TS 23.090, V8.0.0, pp. 1-32 (Dec. 2008).
"3rd Generation Partnership Project; Technical Specification Group Services and System Aspects; Unstructured Supplementary Service Data (USSD)—Stage 1 (Release 8)," 3GPP TS 22.090, V8.0.0, pp. 1-10 (Dec. 2008).
"Digital cellular telecommunications system (Phase 2+); Universal Mobile Telecommunications System (UMTS); Circuit Switched (CS) fallback in Evolved Packet System (EPS); Stage 2 (3GPP TS 23.272 V 8.0.0 Release 8)," ETSI TS 123 272 V8.0.0, pp. 1-42 (Nov. 2008).
Dierks et al., "The Transport Layer Security (TLS) Protocol Version 1.2," RFC 5246, pp. 1-208 (Aug. 2008).
3rd Generation Partnership Project "Technical Specification Group Core Network and Terminals; Study into routeing of MT-SMs via the HPLMN (Release 7)," 3GPP TR 23.840 V7.1.0 (Mar. 2007).
Hakala et al., "Diameter Credit-Control Application," RFC 4006, pp. 1-115 (Aug. 2005).
Housley et al., "Internet X.509 Public Key Infrastructure Certificate and Certificate Revocation List (CRL) Profile," RFC 3280, pp. 1-258 (Apr. 2002).
First Examination Report for Indian Patent Application Serial No. 201947032194 (dated Mar. 20, 2021).
Communication under Rule 71(3) EPC Intent to Grant for European Patent Application Serial No. 18 755 330.0 (dated Mar. 16, 2021).
Advisory Action for U.S. Appl. No. 15/990,196 (dated Jan. 4, 2021).
Interview Summary for U.S. Appl. No. 15/990,196 (dated Jan. 19, 2021).
Final Office Action for U.S. Appl. No. 15/990,196 (dated Sep. 18, 2020).
Communication of European publication number and information on the application of Article 67(3) EPC for European Patent Application Serial No. 18815391.0 (dated Aug. 19, 2020).
Notice of Allowance and Fee(s) Due for U.S. Appl. No. 16/575,962 (dated Jul. 28, 2020).
Communication pursuant to Article 94(3) EPC for European Patent Application Serial No. 18 706 338.3 (dated Jul. 20, 2020).
Communication pursuant to Article 94(3) EPC for European Patent Application Serial No. 18 705 270.9 (dated Jul. 20, 2020).
Communication pursuant to Article 94(3) EPC for European Patent Application Serial No. 18 704 770.9 (dated Jul. 14, 2020).
"3rd Generation Partnership Project; Technical Specification Group Core Network and Terminals; Location Services (LCS); Diameter-based SLh interface for Control Plane LCS (Release 16)," 3GPP TS 29.173 V16.0.0, pp. 1-19 (Jul. 2020).
"3rd Generation Partnership Project; Technical Specification Group Services and System Aspects; Architecture enhancements to facilitate communications with packet data networks and applications (Release 16)," 3GPP TS 23.682 V16.7.0, pp. 1-134 (Jul. 2020).
"3rd Generation Partnership Project; Technical Specification Group Core Network and Terminals; Home Subscriber Server (HSS) diameter interfaces for interworking with packet data networks and applications (Release 16)," 3GPP TS 29.336 V16.2.0, pp. 1-79 (Jun. 2020).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 16)," 3GPP TS 29.272 V16.3.0, pp. 1-177 (Jun. 2020).
"3rd Generation Partnership Project; Technical Specification Group Core Network and Terminals; T8 reference point for Northbound APIs; (Release 16)," 3GPP TS 29.122 V16.6.0, pp. 1-360 (Jun. 2020).
Communication of European publication number and information on the application of Article 67(3) EPC for European Patent Application Serial No. 18755330.0 (dated Apr. 22, 2020).
Non-Final Office Action and Examiner-Initiated Interview Summary for U.S. Appl. No. 15/990,196 (dated Apr. 3, 2020).
"3rd Generation Partnership Project; Technical Specification Group Core Network and Terminals; Mobility Management Entity (MME) and Serving GPRS Support Node (SGSN) interfaces for interworking with packet data networks and applications (Release 16)," 3GPP TS 29.128 V16.1.0, pp. 1-51 (Mar. 2020).
"Oracle® Communications Diameter Signaling Router Service Capability Exposure Function User's Guide," Release 8.4, F12301-02, Oracle, pp. 1-150 (Jan. 2020).
Notice of Allowance and Fee(s) Due for U.S. Appl. No. 16/121,203 (dated Nov. 18, 2019).

(56) References Cited

OTHER PUBLICATIONS

Commonly-assigned, co-pending U.S. Appl. No. 16/575,962 for "Methods, Systems and Computer Readable Media for Providing Integrated Service Capability Exposure Function (SCEF), Service Capability Server (SCS) and Application Server (AS) Services," (Unpublished, filed Sep. 19, 2019).
Notice of Allowance and Fee(s) Due, Examiner-Initiated Interview Summary, and AFCP 2.0 Decision for U.S. Appl. No. 15/608,595 (dated Aug. 20, 2019).
Notice of Allowance and Fee(s) Due and AFCP 2.0 Decision for U.S. Appl. No. 15/604,132 (dated Aug. 8, 2019).
Notice of Allowance and Fee(s) Due for U.S. Appl. No. 15/649,627 (dated May 30, 2019).
Corrected Notice of Allowability for U.S. Appl. No. 15/679,124 (dated May 22, 2019).
Final Office Action for U.S. Appl. No. 15/608,595 (dated Apr. 29, 2019).
Applicant-Initiated Interview Summary for U.S. Appl. No. 15/608,595 (dated Apr. 22, 2019).
Notice of Allowance and Fee(s) Due for U.S. Appl. No. 15/499,847 (dated Apr. 17, 2019).
Final Office Action for U.S. Appl. No. 15/604,132 (dated Apr. 16, 2019).
Notification of Transmittal of the International Search Report and the Written Opinion of the International Searching Authority, or the Declaration for International Application Serial No. PCT/US2018/059282 (dated Feb. 11, 2018).
Notice of Allowance and Fee(s) Due for U.S. Appl. No. 15/679,124 (dated Feb. 12, 2019).
Notification of Transmittal of the International Search Report and the Written Opinion of the International Searching Authority, or the Declaration for International Application Serial No. PCT/US2018/059282 (dated Feb. 11, 2019).
Non-Final Office Action for U.S. Appl. No. 15/649,627 (dated Jan. 23, 2019).
Applicant-Initiated Interview Summary for U.S. Appl. No. 15/499,847 (dated Jan. 22, 2019).
Applicant-Initiated Interview Summary for U.S. Appl. No. 15/604,132 (dated Jan. 22, 2019).
Non-Final Office Action for U.S. Appl. No. 15/608,595 (dated Jan. 8, 2019).
Notice of Allowance and Fee(s) Due for U.S. Appl. No. 15/804,974 (dated Nov. 13, 2018).
Notification of Transmittal of the International Search Report and the Written Opinion of the International Searching Authority, or the Declaration for International Application Serial No. PCT/US2018/041911 (dated Oct. 12, 2018).
Non-Final Office Action for U.S. Appl. No. 15/679,124 (dated Oct. 4, 2018).
Non-Final Office Action for U.S. Appl. No. 15/604,132 (dated Oct. 2, 2018).
Non-Final Office Action for U.S. Appl. No. 15/499,847 (dated Oct. 2, 2018).
Commonly-assigned, co-pending U.S. Appl. No. 16/121,203 for "Methods, Systems and Computer Readable Media for Overload and Flow Control at a Service Capability Exposure Function (SCEF)," (Unpublished, filed Sep. 4, 2018).
Commonly-assigned, co-pending International Patent Application Serial No. PCT/US18/41911 for "Methods, Systems, and Computer Readable Media for Dynamically Provisioning Session Timeout Information in a Communications Network," (Unpublished, filed Jul. 12, 2018).
"3rd Generation Partnership Project; Technical Specification Group Services and System Aspects; Architecture enhancements to facilitate communications with packet data networks and applications (Release 15)," 3GPP TS 23.682, V15.5.0, pp. 1-125 (Jun. 2018).
Commonly-assigned, co-pending U.S. Appl. No. 15/990,196 for "Methods, Systems, and Computer Readable Media for Detecting and Mitigating Effects of Abnormal Behavior of a Machine Type Communication (MTC) Device," (Unpublished, filed May 25, 2018).

Non-Final Office Action for U.S. Appl. No. 15/804,974 (dated May 10, 2018).
Notification of Transmittal of the International Search Report and the Written Opinion of the International Searching Authority, or the Declaration for International Application No. PCT/US2018/016044 (dated Apr. 24, 2018).
Notification of Transmittal of the International Search Report and the Written Opinion of the International Searching Authority, or the Declaration for International Application No. PCT/US2018/016047 (dated Apr. 24, 2018).
Notification of Transmittal of the International Search Report and the Written Opinion of the International Searching Authority, or the Declaration for International Application No. PCT/US2018/016045 (dated Apr. 24, 2018).
"3rd Generation Partnership Project; Technical Specification Group Services and System Aspects; Architecture enhancements to facilitate communications with packet data networks and applications (Release 15)," 3GPP TS 23.682, V15.4.0, pp. 1-122 (Mar. 2018).
"3rd Generation Partnership Project; Technical Specification Group Services and System Aspects; General Packet Radio Service (GPRS) enhancements for Evolved Universal Terrestrial Radio Access Network (E-UTRAN) access (Release 15)," 3GPP TS 23.401, V15.3.0, pp. 1-405 (Mar. 2018).
Commonly-assigned, co-pending U.S. Appl. No. 15/804,974 for "Methods, Systems, and Computer Readable Media for using Authentication Validation Time Periods," (Unpublished, filed Nov. 6, 2017).
"Universal Mobile Telecommunications System (UMTS); LTE; Diameter-based T4 Interface for communications with packet data networks and applications (3GPP TS 29.337 V14.2.0 Release 14)," ETSI TS 129 337 V14.2.0, pp. 1-25 (Oct. 2017).
Commonly-assigned, co-pending U.S. Appl. No. 15/679,124 for "Methods, Systems, and Computer Readable Media for Optimizing Machine Type Communication (MTC) Device Signaling," (Unpublished, filed Aug. 16, 2017).
Commonly-assigned, co-pending U.S. Appl. No. 15/649,627 for "Methods, Systems, and Computer Readable Media for Dynamically Provisioning Session Timeout Information in a Communications Network," (Unpublished, filed Jul. 13, 2017).
"Universal Mobile Telecommunications System (UMTS); LTE; Evolved Packet System (EPS); Mobility Management Entity (MME) and Serving GPRS Support Node (SGSN) related interfaces based on Diameter protocol (3GPP TS 29.272 V14.4.0 Release 14)," ETSI TS 129 272 V14.4.0, pp. 1-171 (Jul. 2017).
Commonly-assigned, co-pending U.S. Appl. No. 15/604,132 for "Methods, Systems and Computer Readable Media for Providing Integrated Service Capability Exposure Function (SCEF), Service Capability Server (SCS) and Application Server (AS) Services," (Unpublished, filed May 24, 2017).
"Universal Mobile Telecommunications System (UMTS); LTE; Home Subscriber Server (HSS) diameter interfaces for interworking with packet data networks and applications (3GPP TS 29.336 V14.1.0 Release 14)," ETSI TS 129 336 V14.1.0, pp. 1-66 (May 2017).
"Digital cellular telecommunications system (Phase 2+) (GSM); Universal Mobile Telecommunications System (UMTS); LTE; Circuit Switched (CS) fallback in Evolved Packet System (EPS); Stage 2 (3GPP TS 23.272 V14.0.0 Release 14)," ETSI TS 123 272 V14.0.0, pp. 1-105 (May 2017).
"LTE; General Packet Radio Service (GPRS) enhancements for Evolved Universal Terrestrial Radio Access Network (E-UTRAN) access (3GPP TS 23.401 V14.3.0 Release 14)," ETSI TS 123 401 V14.3.0, pp. 1-392 (May 2017).
Commonly-assigned, co-pending U.S. Appl. No. 15/499,847 for "Methods, Systems and Computer Readable Media for Providing Service Capability Exposure Function (SCEF) as a Diameter Routing Agent (DRA) Feature," (Unpublished, filed Apr. 27, 2017).
Commonly-assigned, co-pending U.S. Appl. No. 15/608,595 for "Methods, Systems and Computer Readable Media for Providing Service Capability Exposure Function (SCEF) as a Cloud Service," (Unpublished, filed May 30, 2017).

(56) References Cited

OTHER PUBLICATIONS

"LTE; Evolved Universal Terrestrial Radio Access Network (E-UTRAN); S1 Application Protocol (S1AP) (3GPP TS 36.413 version 14.2.0 Release 14)," ETSI TS 136 413, V14.2.0, pp. 1-349 (Apr. 2017).
"Universal Mobile Telecommunications System (UMTS); LTE; Tsp interface protocol between the MTC Interworking Function (MTC-IWF) and Service Capability Server (SCS) (3GPP TS 29.368 V14.1.0 Release 14)," ETSI TS 129 368 V14.1.0, pp. 1-34 (Apr. 2017).
"3rd Generation Partnership Project; Technical Specification Group Services and System Aspects; Architecture enhancements to facilitate communications with packet data networks and applications (Release 15)," 3GPP TS 23.682 V15.0.0, pp. 1-109 (Mar. 2017).
"3rd Generation Partnership Project; Technical Specification Group Core Network and Terminals; Home Subscriber Server (HSS) diameter interfaces for interworking with packet data networks and applications (Release 14)," 3GPP TS 29.336 V.14.1.0, pp. 1-67 (May 2017).
"3rd Generation Partnership Project; Technical Specification Group Services and System Aspects; Architecture enhancements to facilitate communications with packet data networks and applications (Release 14)," 3GPP TS 23.682, V14.2.0, pp. 1-104 (Dec. 2016).
"Change Request," InterDigital, Meeting ARC#25, Doc# ARC-2016-0439-TS-0026_sec5_sec6.1, pp. 1-16 (Oct. 17, 2016).
Abu-Lebdeh et al., "A Virtual Network PaaS for 3GPP 4G and Beyond Core Network Services," pp. 1-7 (Aug. 20, 2016).
Donovan, "Diameter Routing Message Priority," RFC 7944, pp. 1-18 (Aug. 2016).
"Universal Mobile Telecommunications System (UMTS); Mobility Management Entity (MME) and Serving GPRS Support Node (SGSN) interfaces for interworking with packet data and applications (3GPP TS 29.128 V13.0.0, Release 13)," ETSI TS 129.128 V13.0.0, pp. 1-40 (May 2016).
"Universal Mobile Telecommunications System (UMTS); LTE; Home Subscriber Server (HSS) diameter interfaces for interworking with packet data networks and applications (3GPP TS 29.339 version 13.3.0 Release 13)," ETSI TS 129 336 V13.3.0, pp. 1-56 (Apr. 2016).
"3rd Generation Partnership Project; Technical Specification Group Services and System Aspects; Architecture enhancements to facilitate communications with packet data networks and applications (Release 13)," 3GPP TS 23.682 V13.5.0, pp. 1-90 (Mar. 2016).
"Digital cellular telecommunications system (Phase 2+) (GSM); Universal Mobile Telecommunications System (UMTS); LTE; Architecture enhancements to facilitate communications with packet data networks and applications (3GPP TS 23.682 V13.4.0 Release 13)," ETSI TS 123 682 V13.4.0, pp. 1-82 (Mar. 2016).
"Universal Mobile Telecommunications System (UMTS); LTE; Home Subscriber Server (HSS) diameter interfaces for interworking with packet data networks and applications (3GPP TS 29.336 V13.2.0 Release 13)," ETSI TS 129.336 V13.2.0, pp. 1-48 (Mar. 2016).
"Routing Non-IP Data to/from Multiple UE Applicatons and Multiple SCS/AS's," Convida Wireless, 3FPP TSG-SA WG2 #113AH, pp. 1-6 (Feb. 2016).
"Cloud Innovation Solution," ZTE Corporation, pp. 1-31 (2016).
Taleb et al., "EASE: EPC as a Service to Ease Mobile Core Network Deployment over Cloud," IEEE Network, pp. 78-88 (Mar./Apr. 2015).
"Universal Mobile Telecommunications System (UMTS); LTE; Tsp interface protocol between the MTC Interworking Function (MTC-IWF) and Service Capability Server (SCS) (3GPP TS 29.368 V12.2.0 Release 12)," ETSI TS 129.368 V12.2.0, pp. 1-29 (Oct. 2014).
Mendyk, "NFV + SDN—network in the cloud or cloud in the network?," NFV/IT Transformation, pp. 1-3 (Oct. 7, 2014).
Taleb et al., "Virtualizing the LTE Evolved Packet Core (EPC)," Proc. European Conf. on Networks and Communications (EUCNC), pp. 1-2 (Jun. 2014).

Fajardo et al., "Diameter Base Protocol," RFC 6733, pp. 1-152 (Oct. 2012).
Croft, N., "On Forensics: A Silent SMS Attack," Information and Computer Security Architectures (ICSA) Research Group, Department of Computer Science, pp. 1-4, University of Pretoria, South Africa (2012).
"Digital cellular telecommunications system (Phase 2+); Universal Mobile Telecommunications System (UMTS); LTE; Service requirements for Machine-Type Communications (MTC); Stage 1 (3GPP TS 22.368 V11.6.0 Release 11)," ETSI TS 122 368 V11.6.0, pp. 1-20 (Sep. 2012).
FPGAs.
ASICs.
http://www.soqube.com/tariktaleb/public_html1.1/Library/conf_papers/nw_conf/vEPC-EUCNC.epdf.
Final Official Action for U.S. Appl. No. 12/722,141 (dated Apr. 24, 2012).
Non-Final Official Action for U.S. Appl. No. 12/722,141 (dated Sep. 22, 2011).
Notification of Transmittal of the International Search Report and the Written Opinion of the International Searching Authority, or the Declaration for International Application No. PCT/US2010/026964 (dated Sep. 27, 2010).
"Digital cellular telecommunications system (Phase 2+); Universal Mobile Telecommunications System (UMTS); Technical realization of Short Message Service (SMS)," 3GPP TS 23.040, Version 9.1.0, Release 9 (Jan. 2010).
"Messaging Service Suite," http://www.telogic.com.sg/Telecom_Sol_MessagingService.html, Telogic Co. (Copyright 2006).
SMS Test Numbers: SMS Fake Delivery Receipts, Fake DLR—Tel!—SMS Test Platform and SMS services, Nov. 6, 2020, pp. 1-6, https://telqtele.com/sms-fake-delivery-receipts-fake-dlr/.
Constantin, L., "Remote SMS attack can force mobile phones to send premium-rate text messages: Applications installed by operators on SIM cards can be exploited remotely for SMS fraud and DoS purposes," IDG News Service, Dec. 19, 2011, pp. 1-5, IDG Communications, Inc., United States.
3GPP TS 29.338 version 11.0.0 Release 11, "Diameter based protocols for support of SMS capable MMEs.," Universal Mobile Telecommunications System (UMTS); LTE; Jan. 2013, pp. 1-42, France.
Croft, N., "On Forensics: A Silent SMS Attack," Information and Computer Security Architectures (ICSA) Research Group, Department of Computer Science, pp. 1-4, University of Pretoria, South Africa.
Notice of Allowance and Fee(s) Due for U.S. Appl. No. 16/932,226 (dated Mar. 9, 2022).
"3rd Generation Partnership Project; Technical Specification Group Services and System Aspects; Policy and charging control architecture (Release 14)." 3GPP TS 23.203 V14.40.0, pp. 128-131 (Jun. 2017).
Office Action for Japanese Patent Application Serial No. 2020-501192 (dated Mar. 8, 2022).
"RAN1 Radio Layer 1 (Physical Layer)," 3GPP TSG RAN WG1-4, pp. 1-2 (Oct. 15, 2021).
Notice of Decision to Grant Chinese Application Serial No. 201880014276.1 (dated Jan. 26, 2022).
Office Action for Chinese Patent Application Serial No. 201880014297.3 (dated Jan. 13, 2022).
Office Action for Chinese Patent Application Serial No. 201880014277.6 (dated Jan. 13, 2022).
First Examination Report for Indian Patent Application Serial No. 201947045067 (dated Jan. 7, 2022).
Notice of Decision to Grant for European Patent Application No. 18706338.3 (dated Dec. 23, 2021).
Office Action for Japanese Patent Application Serial No. 2019-543040 (dated Dec. 10, 2021).
Notice of Decision to Grant for European Patent Application No. 18704770.9 (dated Dec. 2, 2021).
Notice of Allowance and Fee(s) Due for U.S. Appl. No. 16/932,226 (dated Nov. 12, 2021).
First Examination Report for Indian Patent Application Serial No. 202047015197 (dated Nov. 5, 2021).

(56) References Cited

OTHER PUBLICATIONS

Notification of the First Office Action for Chinese Patent Application Serial No. 201880070292.2 (dated Oct. 30, 2021).
Office Action for Japanese Patent Application Serial No. 2019-543087 (dated Oct. 12, 2021).
Office Action for Japanese Patent Application Serial No. 2019-542404 (dated Oct. 12, 2021).
First Examination Report for Indian Patent Application Serial No. 201947032003 (dated Oct. 6, 2021).
First Examination Report for Indian Patent Application Serial No. 201947032980 (dated Oct. 4, 2021).
Notice of Intention to Grant for European Patent Application No. 187066338.3 (dated Aug. 17, 2021).
Notification of the First Office Action for Chinese Patent Application Serial No. 201880014276.1 (dated Aug. 4, 2021).
Commonly-assigned, co-pending U.S. Appl. No. 17/331,620 for "Methods, Systems, and Computer Readable Media for Determining Time Related Parameter Values for a Communications Network," (Unpublished, filed May 26, 2021).
Communication of European publication number and information on the application of Article 67(3) EPC for European Patent Application Serial No. 18704770.9 (dated Dec. 4, 2019).
Communication of European publication number and information on the application of Article 67(3) EPC for European Patent Application Serial No. 18705270.9 (dated Dec. 4, 2019).
Communication of European publication number and information on the application of Article 67(3) EPC for European Patent Application Serial No. 18706338.3 (dated Dec. 4, 2019).
Nokia et al., "Support of the mapping from IP addressing information provided to an AF to the user identity," 3GPP SA WG2 Meeting #142e pp. 1-3 (Nov. 16-20, 2020).
China Telecom, "KI #13, New Sol: Trigger Procedures for Requesting Analytics," 3GPP SA WG2 Meeting #S2-139E pp. 1-4 (Aug. 19-Sep. 2, 2020).
Notification of Transmittal of the International Search Report and the Written Opinion of the International Searching Authority, or the Declaration for International Application No. PCT/US2021/057156 (dated Mar. 3, 2022).
First Office Action for Japanese Application Serial No. 2021545918 (dated Mar. 8, 2022).
Non-Final Office Action for U.S. Appl. No. 17/129,487 (dated Mar. 21, 2022).
Decision to grant a European patent pursuant to Article 97(1) EPC for European Patent Application Serial No. 19710842.6 (dated Feb. 24, 2022).
Notice of Allowance for Chinese Application Serial No. 201880040478.3 (dated Feb. 28, 2022).
Notice of Allowance for Japanese Application Serial No. 2019572174 (dated Feb. 8, 2022).
Final Office Action for U.S. Appl. No. 17/099,683 (dated Feb. 15, 2022).
Notification of Transmittal of the International Search Report and the Written Opinion of the International Searching Authority, or the Declaration for International Application No. PCT/US2021/057157 (dated Jan. 27, 2022).
Notification Concerning Availability of the Publication of the International Application for International Application No. PCT/US2021/024002 (dated Jan. 20, 2022).
Examination Report for Indian Application Serial No. 202147005810 (dated Jan. 24, 2022).
Examination Report for Indian Application Serial No. 202147001641 (dated Jan. 13, 2022).
Examination Report for Indian Application Serial No. 202047056970 (dated Jan. 13, 2022).
Commonly-assigned, co-pending U.S. Appl. No. 17/319,023 for "Methods, Systems, and Computer Readable Media for Conducting a Velocity Check for Outbound Subscribers Roaming to Neighboring Countries," (Unpublished, May 12, 2021).
Nokia et al., "3gpp-Sbi-Consumer-Id," 3GPP TSG-CT WG4 Meeting #101e pp. 1-4 (Nov. 3-13, 2020).

Nokia et al., "SBA Network Function certificate profile," 3GPTT TSG-SA WG3 Meeting #98e pp. 1-5 (Mar. 2-6, 2020).
"3rd Generation Partnership Project; Technical Specification Group Services and System Aspects; Security Aspects; Study on security aspects of the 5G Service Based Architecture (SBA) (Release 16)," 3GPP TR 33.855, V1.3.0 pp. 1-52 (Nov. 2018).
Notification of Transmittal of the International Search Report and the Written Opinion of the International Searching Authority, or the Declaration for International Application No. PCT/US2021/042660 (dated Oct. 26, 2021).
Hearing Notice of Indian Application Serial No. 201947047367 (Oct. 11, 2021).
First Office Action for Japanese Application Serial No. 2019572174 (dated Sep. 14, 2021).
Notification of Transmittal of the International Search Report and the Written Opinion of the International Searching Authority, or the Declaration for International Application No. PCT/US2021/033030 (dated Aug. 20, 2021).
First Office Action for Chinese Application Serial No. 201880040478.3 (dated Aug. 26, 2021).
Notification Concerning Availability of the Publication of the International Application for International Application No. PCT/US2020/065763 (dated Jul. 8, 2021).
Non-Final Office Action for U.S. Appl. No. 17/099,683 (dated Sep. 20, 2021).
Decision to grant a European patent pursuant to Article 97(1) EPC for European Patent Application Serial No. 18756018.0 (dated Jul. 29, 2021).
Decision to grant a European patent pursuant to Article 97(1) EPC for European Patent Application Serial No. 18731923.1 (dated Jul. 15, 2021).
Notification of Transmittal of the International Search Report and the Written Opinion of the International Searching Authority, or the Declaration for International Application No. PCT/US2021/029977 (dated Jul. 9, 2021).
Notification of Transmittal of the International Search Report and the Written Opinion of the International Searching Authority, or the Declaration for International Application No. PCT/US2021/029973 (dated Jul. 7, 2021).
Notification of Transmittal of the International Search Report and the Written Opinion of the International Searching Authority, or the Declaration for International Application No. PCT/US2021/024002 (dated Jun. 29, 2021).
Notification of Transmittal of the International Search Report and the Written Opinion of the International Searching Authority, or the Declaration for International Application No. PCT/US2021/024980 (dated Jun. 23, 2021).
Communication of European publication number and information on the application of Article 67(3) EPC for European Patent Application Serial No. 19710842.6 (dated Apr. 21, 2021).
"3rd Generation Partnership Project; Technical Specification Group Services and System Aspects; Security Aspects; Study on security aspects of the 5G Service based Architecture (SBA) (Release 16)," 3GPP TR 33.855, V16.0.0, pp. 1-104 (Jul. 2020).
"3rd Generation Partnership Project; Technical Specification Group Services and System Aspects; Security Assurance Specification (SCAS) threats and critical assets in 3GPP network product classes (Release 16)," 3GPP TR 33.926, V16.3.0, pp. 1-60 (Mar. 2020).
"New Annex for the SEPP in TR 33.926," 3GPP TSG-SA WG3 Meeting #95-BIS, pp. 1-6 (Jun. 24-28, 2019).
"N32 message anti-spoofing within the SEPP," 3GPP TSG SA WG3 (Security), Meeting #91, pp. 1-2 (Apr. 16-20, 2018).
Communication under Rule 71 (3) EPC Intention to Grant for European Patent Application Serial No. 18 704 770.9 (dated Jul. 28, 2021).
Examination Report for European Patent Application No. 18705270.9 (dated Jun. 25, 2021).
Notice of Decision to Grant for European Patent Application No. 18755330.0 (dated Jul. 29, 2021).
Kunz et al., "Enhanced 3GPP system for Machine Type Communications and Internet of Things" IEEE Explore, pp. 48-53 (2015).
Non-Final Office Action for U.S. Appl. No. 16/932,226 (dated Jul. 7, 2021).

(56) References Cited

OTHER PUBLICATIONS

Notice of Allowance and Fee(s) Due for U.S. Appl. No. 15/990,196 (dated May 19, 2021).
Notice of Decision to Grant for Chinese Patent Application No. 201880070292.2 (dated Jun. 15, 2022).
Notice of Decision to Grant for Japanese Patent Application No. 2019-542404 (dated May 10, 2022).
Communication pursuant to Article 94(3) EPC for European Patent Application Serial No. 18 815 391.0 (dated Apr. 11, 2022).
Notification of Second Office Action for Chinese Patent Application No. 201880070292.2 (dated Apr. 2, 2022).
Non-Final Office Action for U.S. Appl. No. 17/009,683 (dated Jul. 15, 2022).
Decision to grant a European patent pursuant to Article 97(1) EPC for European Patent Application Serial No. 19710842.6 (dated Jun. 30, 2022).
Notice of Allowance for Chinese Application Serial No. 202080007649.X (dated Jun. 20, 2022).
Communication under Rule 71(3) EPC Intention to Grant for European Patent Application Serial No. 19 749 059.2 (dated May 16, 2022).
Notification of Transmittal of the International Search Report and the Written Opinion of the International Searching Authority or the Declaration for International Application No. PCT/US2021/042853 (dated Oct. 18, 2021).
Advisory Action and Applicant-Initiated Interview Summary for U.S. Appl. No. 17/099,683 (dated May 23, 2022).
Notification of Transmittal of the International Search Report and the Written Opinion of the International Searching Authority, or the Declaration for International Application No. PCT/US2022/013373 (dated Apr. 11, 2022).
Non-Final Office Action and Examiner Interview Summary for U.S. Appl. No. 16/929,048 (dated Apr. 14, 2022).
Notice of Allowance for U.S. Appl. No. 16/732,098 (dated Apr. 6, 2022).
Examination Report for Indian Application Serial No. 202147030053 (dated Mar. 22, 2022).
Non-Final Office Action for Chinese Application Serial No. 202080007649.X (dated Mar. 2, 2022).
Non-Final Office Action for U.S. Appl. No. 17/076,482 (dated Apr. 1, 2022).
"5G; Procedures forthe 5G System (3GPP TS 23.502 version 15.3.0 Release 15)," ETSI TS 123 502, V15.3.0, pp. 1-330 (Sep. 2018).
"Edge Router (DEA)," Mavenir, pp. 1-7 (2017).
Press Release, "Echelon and T-Mobile Announce Alliance to Reduce the Cost of a Secure Smart Grid Network for Utilities," Echelon Corp., https://www.tdworld.com/smart-utility/article/20956244/echelon-and-tmobile-announce-alliance-to-reduce-the-cost-of-a-secure-smart-grid-network-for-utilities, p. 1-10 (May 14, 2009).
Notice of Decision to Grant for Chinese Patent Application No. 201880014277.6 (dated Jun. 1, 2022).
Notice of Decision to Grant for Japanese Patent Application No. 2019-543087 (dated Jun. 7, 2022).
Notice of Allowance and Fee(s) Due and Examiner-Initiated Interview Summary for U.S. Appl. No. 16/929,048 (dated Aug. 24, 2022).
Notification of Transmittal of the International Search Report and the Written Opinion of the International Searching Authority or the Declaration for International Application No. PCT/US2022/026415 (dated Aug. 12, 2022).
Notice to Grant for Japanese Patent Application Serial No. 2021-545918 (dated Jun. 28, 2022).
"5G; Policy and Charging Control signaling flows and parameter mapping (3GPP TS 29.513 version 15.6.0 Release 15)," ETSI TS 129 513, V15.6.0, pp. 1-92 (Jan. 2020).
Final Office Action for U.S. Appl. No. 17/076,482 (dated Aug. 5, 2022).
Notice of Allowance and Fee(s) Due and Examiner-Initiated Interview Summary for U.S. Appl. No. 17/129,487 (dated Jul. 25, 2022).
Notice of Allowance and Fee(s) Due and Examiner-Initiated Interview Summary for U.S. Appl. No. 17/185,934 (dated Jul. 21, 2022).
Notice to Grant for Japanese Patent Application Serial No. 2021-500828 (dated Nov. 25, 2022).
Examination Report for Indian Application Serial No. 202247032585 (dated Nov. 15, 2022).
Non-Final Office Action for Chinese Patent Application Serial No. 202080091056.6 (dated Oct. 27, 2022).
Non-Final Office Action for U.S. Appl. No. 17/008,528 (dated Nov. 10, 2022).
Notification of reasons for refusal for Japanese Patent Application No. 2020-572898 (dated Oct. 25, 2022).
Advisory Action for U.S. Appl. No. 17/076,482 (dated Oct. 25, 2022).
Final Office Action and Applicant-Initiated Interview Summary for U.S. Appl. No. 17/099,683 (dated Oct. 24, 2022).
Communication of European publication number and information on the application of Article 67(3) EPC for European Patent Application No. 20842462.2 (dated Oct. 12, 2022).
Decision to grant a European patent pursuant to Article 97(1) EPC for European Patent Application Serial No. 19749059.2 (dated Sep. 29, 2022).
Decision to Grant for Japanese Patent Application Serial. No. 2020-505462 (dated Aug. 2, 2022).
Non-Final Office Action for U.S. Appl. No. 17/319,023 (dated Sep. 28, 2022).
Non-Final Office Action for U.S. Appl. No. 17/123,038 (dated Sep. 30, 2022).
Communication of European publication number and information on the application of Article 67(3) EPC for European Patent Application Serial No. 20720580.8 (dated Jan. 19, 2022).
"5G; Architecture enhancements for 5G System (5GS) to support network data analytics services (3GPP TS 23.288 version 16.4.0 Release 16)," ETSI TS 123 288, V16.4.0, pp. 1-68 (Jul. 2020).
Notification of Grant for Japanese Patent Application No. 2020-501192 (dated Sep. 13, 2022).
Decision to Grant for Japanese Patent Application No. 2019-543040 (dated Aug. 2, 2022).
Notification of Grant for Chinese Patent Application No. 201880014297.3 (dated Jul. 6, 2022).
Commonly-assigned, co-pending U.S. Appl. No. 17/685,159 for "Methods, Systems, and Computer Readable Media for Notification Delivery," (Unpublished, filed Mar. 2, 2022).
"3rd Generation Partnership Project; Technical Specification Group Core Network and Terminals; 5G System; Network Function Repository Services; Stage 3 (Release 16)", 3GPP TS 29.510 V16.3.0, pp. 1-172 (Mar. 2020).
Notification of Transmittal of the International Search Report and the Written Opinion of the International Searching Authority, or the Declaration for International Application Serial No. PCT/US2022/030887 (dated Sep. 9, 2022).
Notice of Decision to Grant for Japanese Patent Application No. 2018-01419 11 (dated Sep. 13, 2022).
Notice of Decision to Grant for Chinese Patent Application No. 201880014297.3 (dated Jul. 6, 2022).
Non-Final Office Action for U.S. Appl. No. 17/125,943 (dated Feb. 9, 2023).
Supplemental Notice of Allowability for U.S. Appl. No. 17/076,482 (dated Jan. 19, 2023).
Non-Final Office Action for U.S. Appl. No. 17/129,441 (dated Jan. 19, 2023).
Intent to Grant for European Patent Application No. 18705270.9 (dated Dec. 8, 2022).
Applicant Initiated Interview Summary for U.S. Appl. No. 17/319,023 (dated Jan. 10, 2023).
Non-Final Office Action for U.S. Appl. No. 17/099,683 (dated Jan. 4, 2023).
Telekom, "N32 Message Anti-Spoofing within the SEPP", 3GPP TSG SA WG3 (Security) Meeting #91, S3-181480, pp. 1-2 (Apr. 2018).
Huawei, "New Annex for the SEPP in TR 33.926", 3GPP TSG-SA WG3 Meeting #95-BIS, S3-192180, pp. 1-5 (Jun. 2019).

(56) References Cited

OTHER PUBLICATIONS

"5G; 5G System; Public Land Mobile Network (PLMN) Interconnection; Stage 3 (3GPP TS 29.573 Version 16.3.0 Release 16)," ETSI TS 129 573, V16.3.0, pp. 1-93 (Jul. 2020).
Communication under Rule 71(3) EPC Intention to Grant for European Patent Application Serial No. 20 720 580.8 (dated Dec. 23, 2022).
Non-Final Office Action for U.S. Appl. No. 17/095,420 (dated Jan. 3, 2023).
Applicant-Initiated Interview Summary for U.S. Appl. No. 17/099,683 (dated Dec. 12, 2022).
Notice of Allowance and Fee(s) Due for U.S. Appl. No. 17/076,482 (dated Dec. 1, 2022).
Office Action for Japanese Patent Application No. 2020-524589 (dated Oct. 7, 2022).
"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).
Non-Final Office Action for U.S. Appl. No. 17/331,620 (dated Jan. 9, 2023).
Applicant Initiated Interview Summary for U.S. Appl. No. 17/008,528 (dated Feb. 21, 2023).
Intent to Grant for Japanese Patent Application No. 2021-506739 (dated Jan. 24, 2023).
Notice of Allowance and Fee(s) Due for U.S. Appl. No. 17/319,023 (dated Feb. 10, 2023).
Office Action for CN Patent Application No. 201880040479.8 (dated Nov. 25, 2022).

\* cited by examiner

| SUBSCRIBER ID | LOCATION ID | TIMESTAMP (E.G., WHEN MT-FSM RECEIVED OR FORWARDED) | VALIDATION PERIOD (IN SECONDS) |
|---|---|---|---|
| A | VLR-3 | 2021/02/21 14:34:43 | 60 |
| B | VLR-2 | 2021/02/21 14:31:28 | 60 |
| C | VLR-2 | 2021/02/21 14:34:13 | 100 |
| D | VLR-1 | 2021/02/21 14:34:40 | 60 |
| E | VLR-1 | 2021/02/21 14:34:36 | 60 |
| F | VLR-2 | 2021/02/21 14:34:22 | 45 |
| G | VLR-1 | 2021/02/21 14:30:55 | 30 |

METHODS, SYSTEMS, AND COMPUTER READABLE MEDIA FOR SHORT MESSAGE DELIVERY STATUS REPORT VALIDATION

TECHNICAL FIELD

The subject matter described herein relates to methods and systems for network security. More particularly, the subject matter described herein relates to methods, systems, and computer readable media for short message delivery status report validation.

BACKGROUND

Communications networks can be targeted by malicious actors for a variety of reasons, e.g., financial gain, espionage, or political aims. For example, vulnerabilities associated with signaling system number 7 (SS7) networks and Diameter networks allow some entities to commit fraud, perform unauthorized call interceptions or call taps, and/or steal personal subscriber information. When such issues occur, many times an innocent party may be held responsibility for rectifying and/or mitigating the damage. While network operators generally use security appliances, firewalls, and/or other devices to help prevent unauthorized access to their networks and customers, numerous issues can still exist within their networks due to the inherent security issues associated with protocols and/or procedures used in these networks.

SUMMARY

Methods, systems, and computer readable media for short message delivery status report validation are disclosed. One method occurs at a first network node. The method includes receiving a short message delivery status report appearing to be associated with a short message delivery to a mobile subscriber; determining, using a data store containing information about short message delivery attempts, whether the short message delivery status report is valid or invalid, wherein the information about the short message delivery attempts indicates a validation time period for receiving a valid short message delivery status report; and performing a processing action based on the determination.

One system includes a first network node. The first network node includes at least one processor and memory. The first network node is configured for: receiving a short message delivery status report appearing to be associated with a short message delivery to a mobile subscriber; determining, using a data store containing information about short message delivery attempts, whether the short message delivery status report is valid or invalid, wherein the information about the short message delivery attempts indicates a validation time period for receiving a valid short message delivery status report; and performing a processing action based on the determination.

The subject matter described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term 'node' refers to at least one physical computing platform including one or more processors and memory.

As used herein, the terms 'function' or 'module' refer to software in combination with hardware and/or firmware for implementing features described herein.

BRIEF DESCRIPTION OF THE DRAWINGS

The subject matter described herein will now be explained with reference to the accompanying drawings of which:

FIG. 3 is a diagram illustrating example information associated with short message delivery attempts;

DETAILED DESCRIPTION

Figure 1:
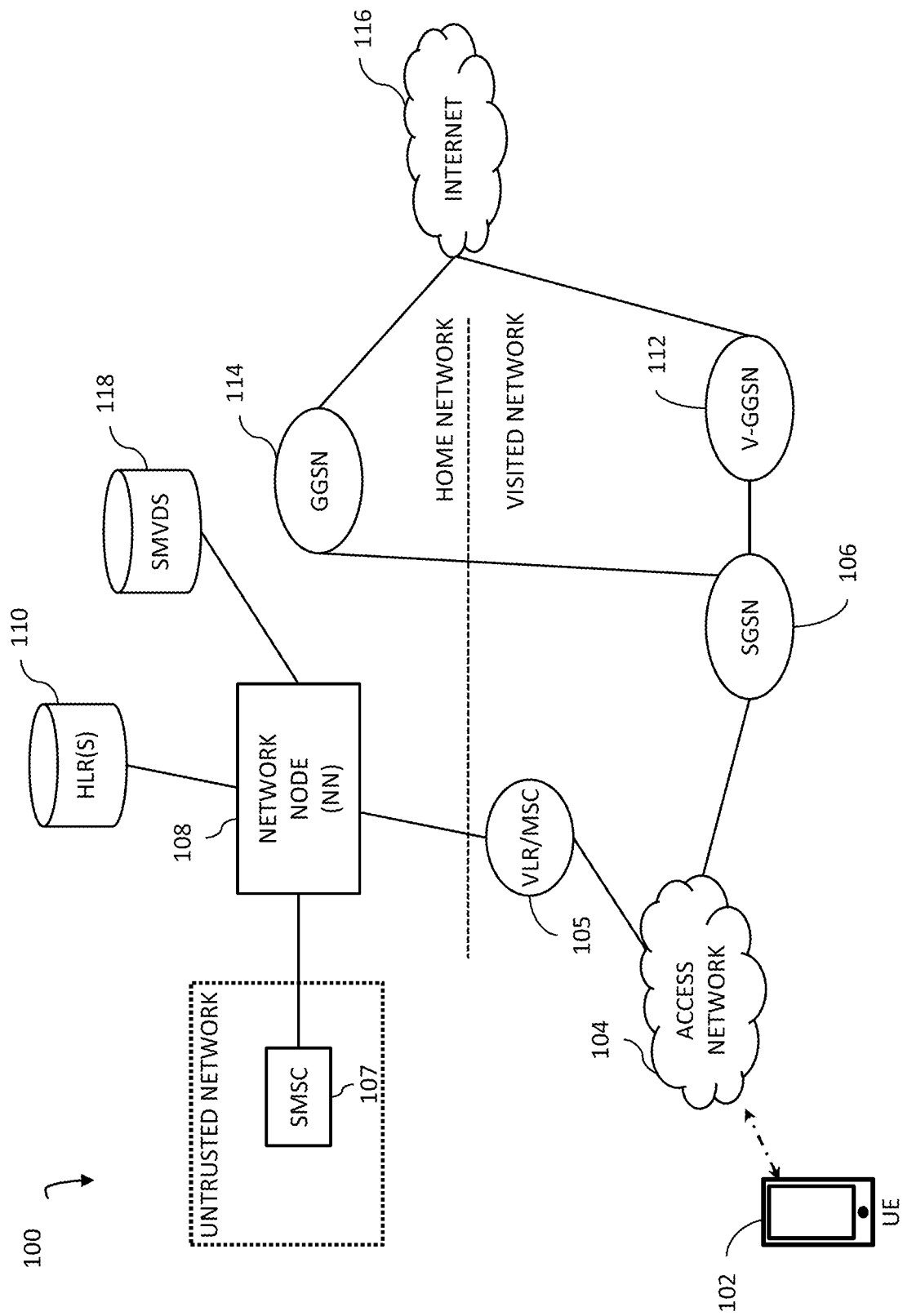
FIG. 1 is a diagram illustrating an example communications environment for short message delivery status report validation.

The subject matter described herein relates to methods, systems, and computer readable media for short message delivery status report validation. Vulnerabilities exist in various communications networks, including mobile communications networks. For example, a malicious network node may be programmed or otherwise configured to generate and send a fraudulent or fake short message delivery status report to a home network such as a home location register (HLR) or another entity (e.g., home subscriber server (HSS)). In this example, the fraudulent short message delivery status report may indicate that a short message service (SMS) message was undeliverable to a mobile subscriber because the mobile subscriber was absent or unreachable. Continuing with this example, the fraudulent short message delivery status report may include information (e.g., in a flag, a parameter, or an attribute value pair (AVP)) indicating that the mobile subscriber is unreachable, e.g., a Mobile-Station-Not-Reachable-Flag (MSNRF) or message-waiting-indication (MWI) data.

Since various mobile communications networks do not validate short message delivery status reports or failed delivery status information therein, a home network or an HLR or HSS therein may act on the fraudulent short message delivery status report by setting a MWI flag or a subscriber unreachable parameter indicating that the mobile subscriber is unreachable. Once the flag or parameter is set, the HLR or HSS may respond to subsequent SMS related messages (e.g., non-priority MAP-SEND-ROUTING-INFO-FOR-SM messages) by sending messages (e.g., a MAP-INFORM-SERVICE-CENTRE message) indicating that the mobile subscriber is unreachable (even if this not true) and, as such, SMS message deliveries to this mobile subscriber may not be attempted until the flag or parameter is cleared. However, this scenario may not be automatically detected and/or may not be easily recoverable. Therefore, fraudulent (e.g., fake or invalid) short message delivery status reports can cause or contribute to a denial of service (DOS) for SMS attack where SMS messages are incorrectly prevented from being delivered to an available mobile subscriber.

In accordance with some aspects of the subject matter described herein, techniques, methods, systems, or mechanisms are disclosed for short message delivery status report validation. For example, a home network node may use a short message delivery status report validation algorithm for determining whether a short message delivery status report from a foreign network node (e.g., a node appearing to be a short message service center (SMSC)) is valid. In this example, a short message delivery status report validation algorithm may involve obtaining subscriber related information (e.g., an international mobile subscriber identity (IMSI), an international mobile equipment identity (IMEI), or a mobile station international subscriber directory number (MSISDN)) from the message comprising the short message delivery status report to be validated and determining whether the subscriber related information matches a data entry stored in a short message validation data store. If a matching data entry is found, it is determined whether the short message delivery status report is received within an acceptable time period (e.g., a predetermined amount time from when a related forward short message request message was forwarded). If the short message delivery status report is received within an acceptable time period, then the short message delivery status report may be deemed valid or likely to be valid and one or more actions may be performed, such as processing the message and/or sending the message onward toward an HLR or HSS. If the short message delivery status report is not received within an acceptable time period or if there is no matching data entry, the short message delivery status report may be deemed invalid or likely to be invalid and one or more mitigation actions may be performed, such as discarding the short message delivery status report (e.g., without sending to an HLR or HSS and/or without modifying a subscriber availability flag in the HLR or HSS based on the short message delivery status report).

Advantageously, by using validation time periods and/or related information associated with short message delivery attempts, a home network node (e.g., an SMS firewall, a virtual signal transfer point (vSTP), or a Diameter signaling router (DSR)) can validate short message delivery status reports (e.g., from a foreign or untrusted SMSC) and perform one or more mitigating actions when a short message delivery status report is determined to be invalid (e.g., fraudulent), thereby preventing or mitigating malicious activities and related consequences (e.g., DoS for SMS messages).

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a diagram illustrating an example communications environment 100 for short message delivery status report validation. FIG. 1 includes a UE 102 (e.g., a mobile device, a computer, a tablet computing platform, or a smartphone) capable of roaming or moving between different portions of a communications environment 100. In some embodiments, communications environment 100 may include nodes associated with a fifth generation (5G) network, a fourth generation (4G) network, a third generation (3G) network and/or a second generation (2G) network.

Communications environment 100 may include a home network, e.g., a home public land mobile network (HPLMN), and a visited network, e.g., a visited public land mobile network (VPLMN). The home network may be associated with UE 102 and may be the UE's default network, while the visited network may be a network that UE 102 may use, may attempt to use, or may appear to use while roaming outside the home network's coverage area. In some embodiments, the home network and the visited network may include nodes for communicating with an external network, such as Internet 116.

The home network may include various nodes, e.g., a gateway general packet radio service (GPRS) support node (GGSN) 114, a network node (NN) 108, one or more HLR(s) 110 and/or a short message validation data store (SMVDS) 118. In some embodiments, a home network may be configured as a mobile subscriber's default roaming provider. In some embodiments, a home network may be configured to allow a mobile subscriber to change his roaming provider, e.g., for a certain or specified period of time.

In some embodiments, a home network and/or its related nodes may be configured to handle data services (e.g., Internet access), e.g., even when its subscribers are using a visited network for voice services. For example, a home network may handle data services for a roaming subscriber by routing a data flow service request through its network regardless of whether a visited network can provide the same services quicker or more cheaply.

In some embodiments, a home network and/or its related nodes may be configured to allow a network operator or service provider that is different from a home network's operator or service provider, referred to herein as an ARP, to provide data services (e.g., Internet access). For example, an ARP may provide data services at lower rates than a mobile subscriber's home network and may also help in alleviating network load or congestion in the mobile subscriber's home network by handling some subscribers' IP traffic.

GGSN 114 may be any suitable entity for providing access to Internet 116 or other data networks, e.g., an Internet access point. In some embodiments, if serving GPRS support node (SGSN) 106 receives a signaling message indicating that a roaming subscriber cannot receive data services via an ARP, SGSN 106 may route IP traffic and/or related messages destined for Internet 116 via GGSN 114 in the home network.

HLR(s) 110 may represent any suitable entity or entities for maintaining and/or providing one or more subscriber data management (SDM) or customer relationship management (CRM) functions. HLR(s) 110 may maintain subscriber-related information, such as user identification, control information for user authentication and authorization, location information, and user profile data. For example, HLR(s) 110 may include a database containing details about a mobile subscriber identity module (SIM) card associated with UE 102, services available to UE 102, and the current location (e.g., current serving node) of UE 102.

In some embodiments, where HLR(s) 110 involves multiple nodes, each node may maintain information for a portion of subscribers, e.g., hundreds of thousands to millions of subscribers and various nodes in communications environment 100 may be configured to identify and consult the appropriate node for information about a particular subscriber.

In some embodiments, HLR(s) 110 may perform mobility management procedures in response to receiving a MAP message or other messages. Mobility management messages may be received from SGSN 106 or other nodes in communications environment 100.

SMSC 107 may represent any suitable entity or entities for facilitating communications of short messages between a short messaging entity (SME) and a mobile device, e.g., UE 102. For example, an SME may an entity that may receive or send short messages and may be located in a fixed network, a mobile device, or another service center. In some embodiments, SMSC 107 may attempt to delivery a short message from an SME to a mobile subscriber that is roaming in a visited network. In this example, SMSC 107 may send one or more SMS related messages (e.g., a send routing information for SM (SRI-SM) request message, an MT forward short message (MT-FSM) request message, and/or a MAP-REPORT-SM-DELIVERY-STATUS message) toward the home network (or node(s) therein) of the mobile subscriber via NN 108. In some embodiments, SMSC 107 may appear to be located in an untrusted network, e.g., a network that is not known or trusted by the home network that includes HLR(s) 110.

NN 108 may be any suitable entity (e.g., one or more computing platforms or devices) for receiving, processing, routing, and/or forwarding messages. In some embodiments, NN 108 may include a gateway, a signaling router, a signaling platform (SP), a signal transfer point (STP), a signaling system number 7 (SS7) node, or a signaling node. For example, NN 108 may route and/or forward various signaling messages (e.g., mobile application part (MAP) messages) between nodes in communications environment 100. In this example, the forwarded signaling message may include SMS messages and/or related messages.

In some embodiments, NN 108 may include a Diameter relay agent and/or a Diameter signaling router (DRA/DSR). For example, NN 108 may route and/or forward various Diameter messages between nodes in communications environment 100.

In some embodiments, NN 108 may include functionality for facilitating communications between nodes in the home network and nodes in the visited network. For example, mobility management messages and/or registration related messages may be sent from a visitor location register (VLR) and/or mobile switching center (MSC), also referred to as VLR/MSC, 105 to HLR(s) 110 via NN 108. While only one NN 108 is depicted in communications environment 100, it will be appreciated that multiple SPs may be used to facilitate communication between nodes in communications environment 100. In some embodiments, NN 108 may include functionality for filtering and/or validating messages and/or for performing global title translation (GTT). For example, NN 108 may analyze header information in signaling messages and may determine how to process or route the signaling messages. In this example, some filtering may include determining whether a signaling message is addressed to an appropriate node or includes appropriate parameters or other information. GTT may include identifying an appropriate destination for a signaling message (e.g., based on global title information) and routing the signaling message to the identified destination.

In some embodiments, NN 108 may include functionality for identifying messages that contain subscriber location information, such as mobility management messages from roaming subscribers. For example, NN 108 may be configured to use GTT functionality, such as filters associated with signaling connection control part (SCCP) subsystem numbers (SSNs) or MAP operation codes (opcodes) to identify relevant messages from a foreign network (e.g., a visited network). In this example, NN 108 may identify relevant messages by filtering signaling messages associated with a VLR, and/or HLR(s) 110 and/or by filtering certain types of signaling messages or SMS related messages using opcodes (e.g., a MAP MT-FSM message may be associated with an opcode value of '46' or '44').

In some embodiments, NN 108 may include functionality for acting as a short message proxy server and may provide SMS forwarding service to subscribers. For example, NN 108 may transparently relay SRI-SM requests to HLR(s) 110 and modify corresponding SRI-SM responses in such a way that related MT-FSM requests are routed to NN 108. In this example, NN 108 may store (e.g., in SMVDS 118) various short message delivery attempt related information associated with a MT-FSM request or a related message. Example short message delivery attempt related information may include an VLR ID associated with the current location of the mobile subscriber (e.g., the SMS recipient), an IMSI identifying with the recipient, and/or a receive time associated with the MT-FSM request or when the MT-FSM request is forwarded onward from NN 108). Continuing with this example, NN 108 or a related entity may use this stored data to validate subsequent report messages (e.g., messages containing a short message delivery status report) that are appear to be related to one or more SMS delivery attempts.

In some embodiments, NN 108 may include functionality for performing short message delivery status report validation. For example, NN 108 may utilize a short message delivery status report validation algorithm for determining whether a short message delivery status report (e.g., from SMSC 107) is valid. In some embodiments, a short message delivery status report validation algorithm may involve obtaining subscriber related information (e.g., an IMSI, an MSISDN, or an IMEI) from the short message delivery status report (or a related message) to be validated and determining whether the subscriber related information matches a data entry stored in SMVDS 118. If a matching data entry is found, it is determined whether the short message delivery status report is received within an acceptable time period (e.g., within 10-30 seconds from when a related forward short message request message was forwarded by NN 108). If the short message delivery status report is received within an acceptable time period, then the short message delivery status report may be deemed or considered valid or likely to be valid and one or more actions may be performed, such as processing the message and/or sending the message onward toward HLR 110. If the short message delivery status report is not received within an acceptable time period or if there is no matching data entry, the short message delivery status report may be deemed or considered invalid or likely to be invalid and one or more mitigation actions may be performed, such as discarding the short message delivery status report (e.g., without sending to an HLR or HSS and/or without modifying a subscriber availability flag in the HLR or HSS based on the short message delivery status report).

In some embodiments, NN 108 may be configured to perform one or more actions based on a short message delivery status report validation analysis or a related determination. For example, in response to determining that a short message delivery status report is valid, NN 108 may forward the short message delivery status report or a related message to a location register (e.g., HLR(s) 110, HSS, or another location register), may send a message to a node (e.g., a network operator management center) indicating that the short message delivery status report is valid, and/or may copy or store a portion of the short message delivery status report. In another example, in response to determining that a short message delivery status report is invalid, NN 108 may screen, filter, or discard a related message, may stop a related message from reaching a location register, may send a message to a node indicating that the short message delivery status report is invalid, and/or may copy or store a portion of the short message delivery status report.

In some embodiments, NN 108 may include functionality for determining a trust level (e.g., a trustworthiness metric) associated with a network node and may perform various actions based on this determination. For example, NN 108 may utilize one or more data structures (e.g., an allow list and a block list) to identify whether a network node is trusted, untrusted, or unknown and may perform other actions based on this trust level determination. In this example, if a network node is unknown or is untrusted, short message delivery status reports from the network node may be validated before the reports can be forwarded to HLR 110; and if a network node is trusted, short message delivery status reports from the network node may be forwarded to HLR 110 without the short message delivery status reports being validated or may validate only a portion of the short message delivery status reports from the network node.

SMVDS 118 may represent any suitable entity for maintaining and/or providing a repository for information related to short message delivery attempts. For example, SMVDS 118 may include a database or other data store containing IMSIs of subscribers that have been sent an SMS related message (e.g., a forward short message request message) and related SMS delivery attempt information (e.g., a VLR identifier (ID) associated with VLR/MSC 105 originating a forward short message request message and a timestamp indicating when the forward short message request message was received by NN 108 or another node in the home network). In this example, each data entry in SMVDS 118 may be indexed by an IMSI indicating a mobile subscriber recipient for an SMS associated with the forward short message request message. In some embodiments, SMVDS 118 may be queried by various nodes in communications environment 100 to obtain short message delivery attempt information related to a mobile subscriber.

In some embodiments, SMVDS 118 may receive subscriber related information and/or short message delivery attempt information from one or more sources, e.g., NN 108, VLR/MSC 105, HLR(s) 110, SGSN 106, GGSN 114, V-GGSN 112, call/setup control functions (CSCFs), and/or other nodes.

In some embodiments, NN 108 and/or other SPs in communications environment 100 may be configured to access or store relevant information in SMVDS 118 in response to receiving or intercepting SMS related messages, e.g., forward short message request messages and/or short message delivery status report.

The visited network may include an access network 104, VLR/MSC 105, SGSN 106, and a visitor GGSN (V-GGSN) 112. Access network 104 may represent a radio access network and may include various nodes for communicating with UE 102 and elements within communications environment 100. Example nodes in access network 104 may include a node B (NB), a radio network controller, a base station, or other transceiver node, which may perform radio access functions. Access network 104, or nodes therein, may be used for communications between UE 102 and nodes in the visited network or communications environment 100. For example, an NB or other node (e.g., a gateway) may communicate UE-related messages (e.g., authentication or mobility related messages) to SGSN 106 or other nodes.

VLR/MSC 105 may represent any suitable entity or entities for performing one or more mobility management functions, such as tracking UE 102. In some embodiments, VLR/MSC 105 may communicate information (e.g., mobility-related information) to other nodes in communications environment 100. For example, VLR/MSC 105 may receive registration requests from a transceiver node in access network 104 and may communicate with HLR(s) 110 for performing authentication and/or for updating the current location of the mobile subscriber. VLR/MSC 105 may also maintain or store location information for roaming subscribers. Additionally, VLR/MSC 105 may communicate with various other nodes and perform various other functions.

SGSN 106 may represent a node or gateway for facilitating communications between access network 104 and other nodes (e.g., V-GGSN 112) or networks. In some embodiments, SGSN 106 may communicate user traffic to other nodes in communications environment 100. In some embodiments, SGSN 106 may also perform one or more mobility management functions.

V-GGSN 112 may be any suitable entity for providing access to Internet 116 or other data networks, e.g., an Internet access point. In some embodiments, if SGSN 106 receives a signaling message indicating that a roaming subscriber can receive data services via an ARP, SGSN 106 may route IP traffic and/or related messages destined for Internet 116 via V-GGSN 112 in the visited network. In some embodiments, if SGSN 106 receives a signaling message indicating that a roaming subscriber cannot receive data services via an ARP, SGSN 106 may route IP traffic and/or related messages destined for Internet 116 via GGSN 114 in the home network instead of via V-GGSN 112.

It will be appreciated that FIG. 1 is for illustrative purposes and that various nodes and/or modules, locations, and/or functionality described above in relation to FIG. 1 may be changed, altered, added, or removed.

Figure 2:
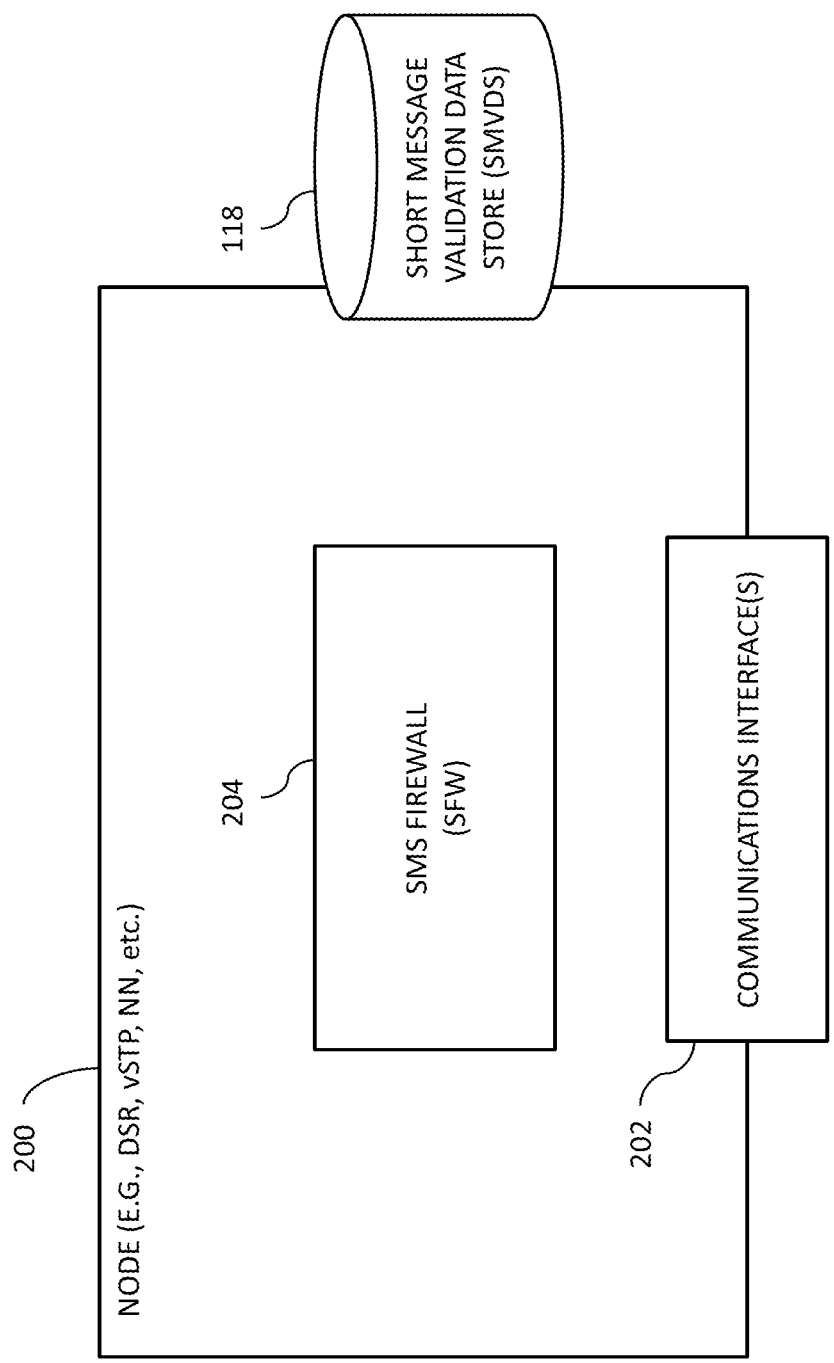
FIG. 2 is a diagram illustrating an example node for short message delivery status report validation.

FIG. 2 is a diagram illustrating an example node 200 for short message delivery status report validation. Node 200 may represent any suitable entity or entities for performing aspects of validating subscriber location information. In some embodiments, node 200 may represent NN 108.

Referring to FIG. 2, node 200 may include one or more communications interface(s) 202 for communicating messages (e.g., via an SS7 interface, or a Diameter interface, or other interfaces). In some embodiments, communications interface(s) 202 may include a first communication interface for communicating with HLR(s) 110 and a second communications interface for communicating with other types of location registers, e.g., an HSS.

In some embodiments, communications interface(s) 202 may be associated with one or more taps (e.g., computing platforms or devices) for intercepting and/or copying messages in communications environment 100.

Node 200 may include an SMS firewall (SFW) 204. SFW 204 may be any suitable entity (e.g., software executing on at least one processor) for performing one or more aspects of short message delivery status report validation or related functionality described above with regard to NN 108. In some embodiments, SFW 204 may include functionality for identifying SMS related messages and for storing relevant SMS related information for validation and/or other security purposes. For example, SFW 204 may identify and process SMS related messages based on header data and/or payload data.

In some embodiments, SFW 204 may include functionality for performing short message delivery status report validation. For example, SFW 204 may utilize a short message delivery status report validation algorithm for determining whether a short message delivery status report (e.g., from SMSC 107) is valid. In some embodiments, a short message delivery status report validation algorithm may involve obtaining subscriber related information (e.g., an IMSI, MSISDN, or IMEI) from the short message delivery status report (or a related message) to be validated and determining whether the subscriber related information matches a data entry stored in SMVDS 118. If a matching data entry is found, it is determined whether the short message delivery status report is received within an acceptable time period (e.g., within 10-500 seconds from when a related forward short message request message was received or forwarded by node 200). If the short message delivery status report is received within an acceptable time period, then the short message delivery status report may be deemed or considered valid or likely to be valid and one or more actions may be performed, such as processing the message and/or sending the message onward toward HLR 110. If the short message delivery status report is not received within an acceptable time period or if there is no matching data entry, the short message delivery status report may be deemed or considered invalid or likely to be invalid and one or more mitigation actions may be performed, such as discarding the short message delivery status report (e.g., without sending to an HLR or HSS and/or without modifying a subscriber availability flag in the HLR or HSS based on the short message delivery status report).

In some embodiments, SFW 204 may be configured to perform one or more actions based on a short message delivery status report validation analysis or a related determination. For example, in response to determining that a short message delivery status report is valid, SFW 204 may forward the short message delivery status report or a related message to a location register (e.g., HLR 110, HSS, or another location register), may send a message to a node (e.g., a network operator management center) indicating that the short message delivery status report is valid, and/or may copy or store a portion of the short message delivery status report. In another example, in response to determining that a short message delivery status report is invalid, SFW 204 may screen, filter, or discard the short message delivery status report or a related message, may stop the short message delivery status report or a related message from reaching a location register, may send a message to a node indicating that the short message delivery status report is invalid, and/or may copy or store a portion of the short message delivery status report.

In some embodiments, SFW 204 may include functionality for determining a trust level (e.g., a trustworthiness metric) associated with a network node (e.g., SMSC 107) and may perform various actions based on this determination. For example, SFW 204 may utilize one or more data structures (e.g., an allow list and a block list) to identify whether a network node is trusted, untrusted, or unknown and may perform other actions based on this trust level determination. In this example, if a network node is unknown or is untrusted, short message delivery status reports from the network node may be validated before the reports can be forwarded to HLR 110; and if a network node is trusted, short message delivery status reports from the network node may be forwarded to HLR 110 without the short message delivery status reports being validated or may validate only a portion of the short message delivery status reports from the network node.

Node 200 or SFW 204 therein may access (e.g., read information from and/or write information to) SMVDS 118 or other data storage. SMVDS 118 or other data storage may be any suitable entity (e.g., a computer readable medium or memory) for storing subscriber related information and/or other data. In some embodiments, SMVDS 118 or other data storage may include subscriber related information and/or short message delivery attempt information usable for determining whether a short message delivery status report is valid or invalid.

It will be appreciated that FIG. 2 and its related description are for illustrative purposes and that node 200 may include additional and/or different modules, components, or functionality.

FIG. 3 is a diagram illustrating example information 300 associated with short message delivery attempts. In some embodiments, information 300 may be stored in SMVDS 118 and may be usable for determining whether a short message delivery status report is valid or invalid. For example, information 300 may be obtained from SRI-SM related messages or MT-FSM request messages that traverse NN 108 or node 200.

Referring to FIG. 3, a table representing data 300 comprises columns and/or fields for subscriber IDs, location IDs, timestamps, and validation time periods. A subscriber ID field may store information for representing an ID (e.g., an IMSI) identifying a mobile subscriber and recipient of an SMS message. For example, each data row of the table of FIG. 3 indicates a different subscriber ID field value (e.g., an IMSI). In some embodiments, a subscriber ID may be usable as a key or lookup value for obtaining SMS delivery attempt related information associated with a corresponding mobile subscriber (e.g., the prospective SMS recipient).

A location ID field may store information for indicating a network or node therein associated with a current or last known location of a corresponding mobile subscriber (e.g., the prospective SMS recipient). For example, each data row of the table of FIG. 3 indicates a VLR ID representing a particular VLR.

A timestamp field may store time related information usable for identifying when a validation time period is active. For example, each data row of the table of FIG. 3 indicates a different timestamp. In this example, each timestamp may represent when a forward short message request message was forward by NN 108 or node 200 to a serving MSC (e.g., VLR/MSC 105) for delivery. In another example, each timestamp may represent when a forward short message request message was received by NN 108 or node 200

A validation time period field may store information indicating a time period in which a valid short message delivery status report can be received. For example, each data row of the table of FIG. 3 indicates a number of seconds representing a validation time period (e.g., as measured from a starting point). Example starting points for a validation time period may be based on a relevant forward short message request message related timestamp, such as when the forward short message request message was received or forwarded by node 200 or NN 108.

In some embodiments, a validation time period or a related value may be predetermined, e.g., a network operator may set a validation time period to a default value (e.g., 60 seconds) for some mobile subscribers but may be different for other subscribers, e.g., values may be based on a predetermined set of rules or criteria, e.g., type of subscriber, subscriber tier, etc. In some embodiments, a validation time period or a related value may be dynamic and may change based on one or more factors, such as time of day, network traffic load or congestion, and/or other criteria.

It will also be appreciated that data 300 is for illustrative purposes and that different and/or additional data than the data depicted in FIG. 3 may be usable for indicating default values for particular data portions or other information. Further, data 300 may be stored in various locations and/or managed using various data structures and/or computer readable media.

Figure 4:
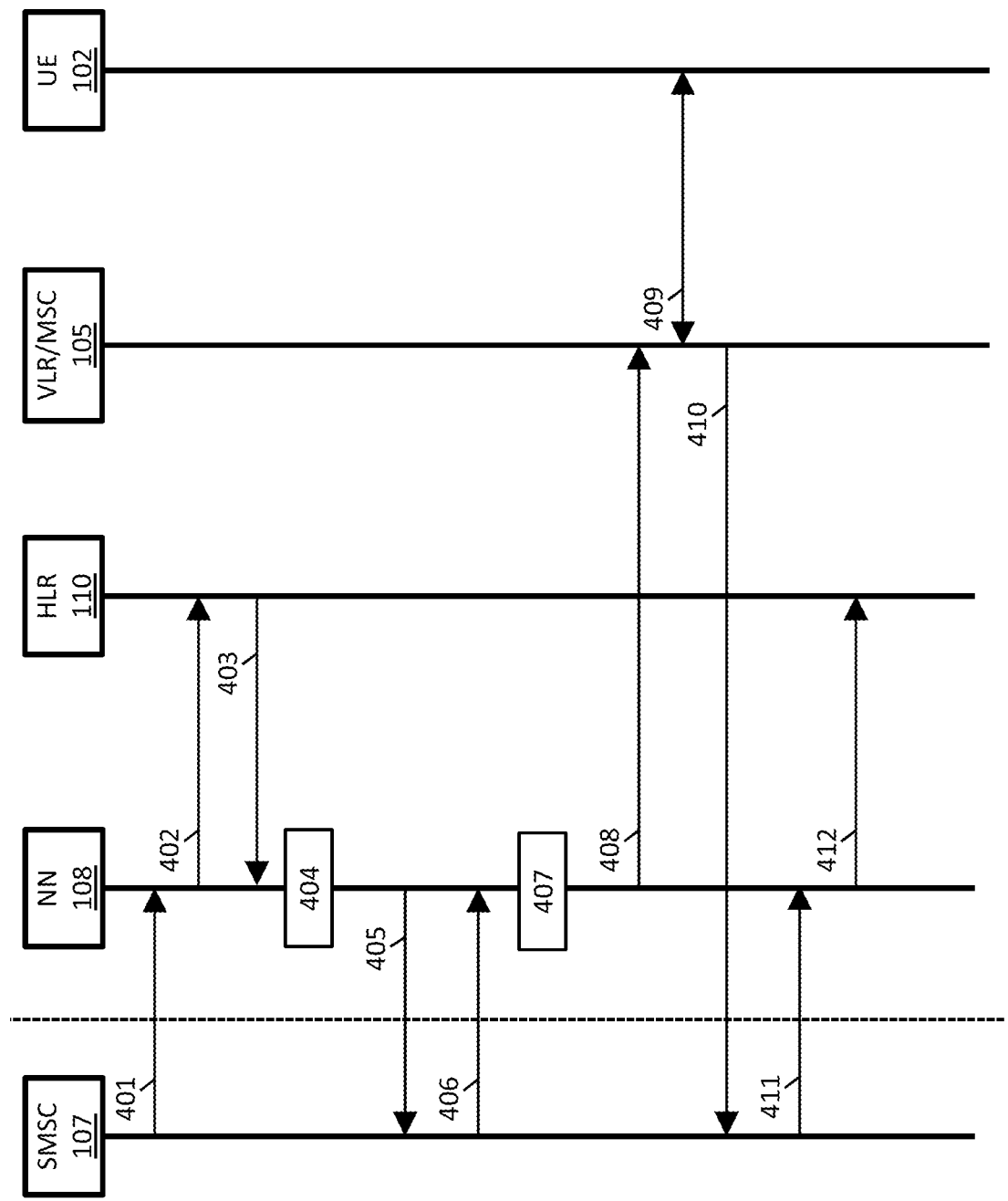
FIG. 4 is a diagram illustrating example messages associated with a mobile terminated (MT) short message delivery.

FIG. 4 is a diagram illustrating example messages associated with a mobile terminated (MT) short message delivery. In some embodiments, e.g., as depicted in FIG. 4, NN 108 may represent a signaling routing node (e.g., a DSR or STP) and may act a home router with SMS firewall and/or proxy functionality. For example, NN 108 may receive and forward various SMS related messages without one or more entities aware of its existence. In this example, NN 108 may transparently relay a SRI-SM request message for requesting routing information associated with a mobile subscriber 'B' to HLR 110 and modify a corresponding SRI-SM response in such a way that a subsequent MT-FSM request is routed to the NN 108. After receipt of the MT-FSM request, NN 10 may modify and forward the MT-FSM request to an appropriate destination, e.g., VLR/MSC 105, for delivery to the mobile subscriber 'B' (e.g., at UE 102).

Referring to FIG. 4, in step 401, SMSC 107 may generate and send a SRI-SM request message to NN 108. For example, a SRI-SM request message may be for requesting routing information associated with a mobile subscriber 'B' and may include a MSISDN or IMSI associated with the mobile subscriber 'B'.

In step 402, NN 108 may forward the SRI-SM request message to HLR 110.

In step 403, HLR 110 may return a SRI-SM response message including an IMSI 'B' associated with the mobile subscriber 'B' and a serving node identifier 'V' (e.g., indicating a serving VLR/MSC 105 associated with the mobile subscriber 'B') to NN 108.

In step 404, NN 108 may receive the SRI-SM response message and may modify the IMSI and serving node parameter values to enforce that a related MT-FSM request message is received by NN 108. For example, NN 108 may replace the IMSI 'B' associated with the mobile subscriber 'B' with a 'scrambled' IMSI 'C' and may replace the serving node identifier 'V' with its own identifier 'Z'. In this example, NN 108 may store a correlation between the original IMSI 'B' and the replaced IMSI 'C' in a local or accessible data store.

In step 405, NN 108 may forward the modified SRI-SM response message to SMSC 107.

In step 406, SMSC 107 may send a MT-FSM request message including parameters for IMSI 'C' and a serving node identifier 'Z' to NN 108.

In step 407, NN 108 may receive the MT-FSM request message and may replace the IMSI and serving node parameter values with the original parameter values found in the local or accessible data store. For example, NN 108 may query the data store using an IMSI 'C' in the received MT-FSM request message to find a data entry indicating the original IMSI 'B' and the original serving node identifier 'V'. In this example, NN 108 may then modify the MT-FSM request message by replacing the IMSI and serving node parameter values with the original parameter values.

In step 408, NN 108 may forward the modified MT-FSM request message to VLR/MSC 105, e.g., based on the original serving node identifier.

In step 409, VLR/MSC 105 may perform a short message delivery procedure for attempting SMS delivery to the mobile subscriber 'B' (e.g., UE 102) and VLR/MSC 105 may receive a response indicating an SMS delivery status (e.g., failed or successful).

In step 410, VLR/MSC 105 may send a MT-FSM response message indicating the SMS delivery status to SMSC 107.

In step 411, SMSC 107 may send a MAP-REPORT-SM-DELIVERY-STATUS request message including MWI data indicating the SMS delivery status. For example, if SMS delivery was unsuccessful (e.g., because a mobile subscriber was absent or unreachable), then the MWI data may include a MSNRF or another parameter indicating that the mobile subscriber was absent or unreachable.

In step 412, NN 108 may forward the MAP-REPORT-SM-DELIVERY-STATUS request message to HLR 110 and act on the MWI data therein.

In some embodiments, e.g., where a short message delivery status report (e.g., MAP-REPORT-SM-DELIVERY-STATUS request message) is not validated before HLR 110 acts on the MWI data therein, abnormal or fraudulent use of a short message delivery status report can cause or achieve an MT SMS DOS attack on a specific mobile subscriber or a set of mobile subscribers. For example, by sending a fraudulent MAP-REPORT-SM-DELIVERY-STATUS request message indicating that the mobile subscriber 'B' is unreachable to HLR 110, HLR 110 may set related parameters (e.g., MWI related flags) associated with the MWI data in the fraudulent message. As such, the MWI related parameters in HLR 110 would result in an MWI related out-of-synchronization state relative to MSC 105 because MSC 105 would not have the same parameters set, e.g., because MSC 105 knows the actual SMS delivery status or reachability of that particular mobile subscriber. Further, in this example, the MWI related out-of-synchronization state may not be automatically detected and therefore may not be easily recoverable. Hence, the impact of a fraudulent or invalid short message delivery status report can cause a targeted mobile subscriber to be associated with an abnormal message waiting state at HLR 110, thereby preventing access to normal SMS delivery for the mobile subscriber.

It will be appreciated that FIG. 4 is for illustrative purposes and that different and/or additional messages and/or actions may be used. It will also be appreciated that various messages and/or actions described herein may occur in a different order or sequence.

Figure 5:
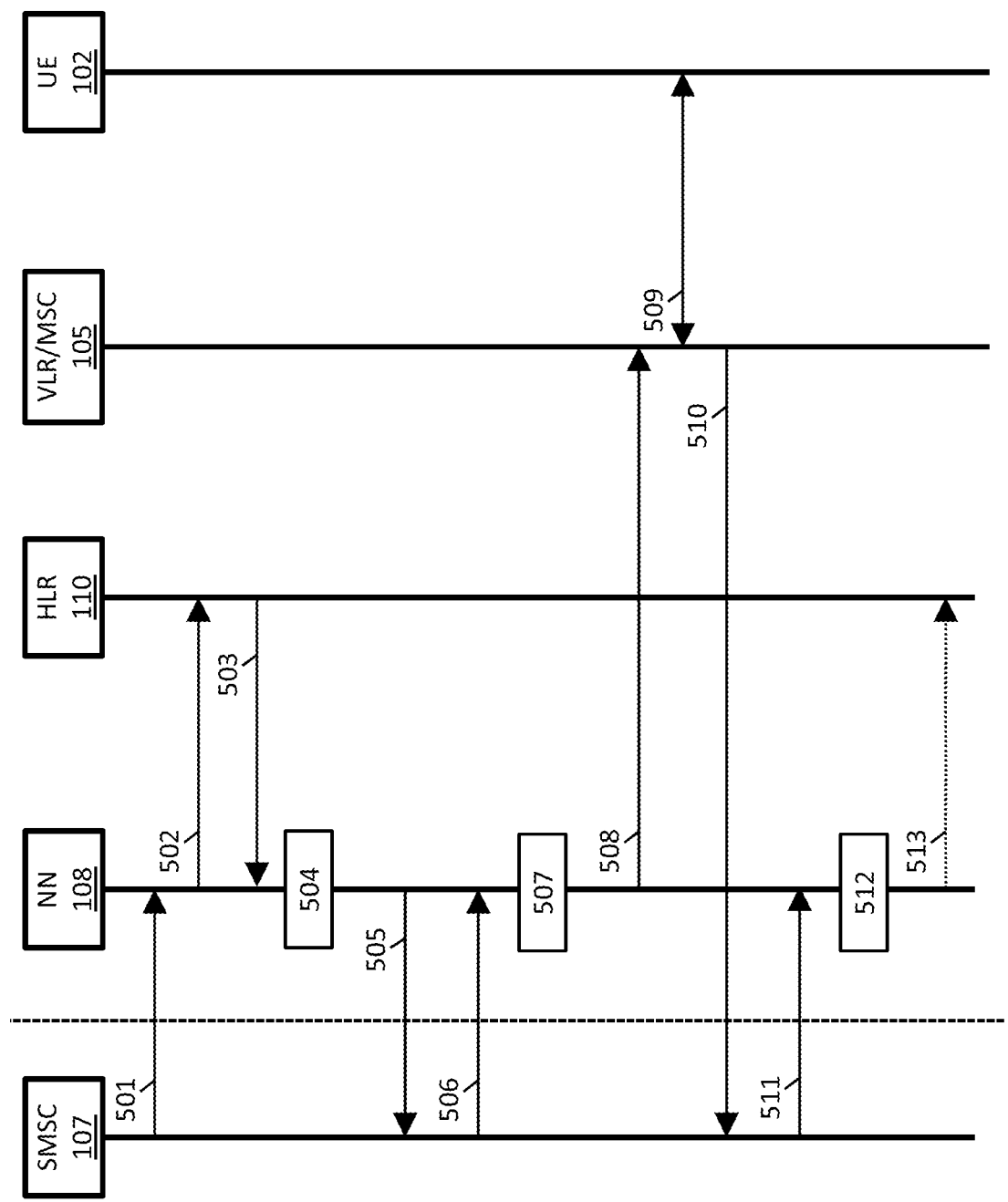
FIG. 5 is a diagram illustrating example messages associated with a short message delivery status report validation.

FIG. 5 is a diagram illustrating example messages associated with a short message delivery status report validation. In some embodiments, e.g., as depicted in FIG. 5, NN 108 may represent a signaling routing node (e.g., a DSR or STP) and may act a home router with SMS firewall and/or proxy functionality. For example, NN 108 may receive and forward various SMS related messages without one or more entities aware of its existence. In this example, NN 108 may transparently relay a SRI-SM request message for requesting routing information associated with a mobile subscriber 'B' to HLR 110 and modify a corresponding SRI-SM response in such a way that a subsequent MT-FSM request is routed to the NN 108. After receipt of the MT-FSM request, NN 108 may modify and forward the MT-FSM request to an appropriate destination, e.g., VLR/MSC 105, for delivery to the mobile subscriber 'B' (e.g., at UE 102).

In some embodiments, e.g., as depicted in FIG. 5, NN 108 may include functionality for performing short message delivery status report validation. For example, NN 108 acting as an SMS firewall or SMS home network router may correlate information associated with MT forward short message (MT-FSM) request messages and corresponding mobile subscribers. In this example, NN 108 may use this information in validating short message delivery status reports (e.g., MAP-REPORT-SM-DELIVERY-STATUS request messages), e.g., thereby ensuring that HLR 110 (or another location register) has or maintains correct statuses for SMS message deliveries to its mobile subscribers.

In some embodiments, NN 108 may be configured to use SMVDS 118 or another data store to store associations or mappings between a subscriber ID (e.g., an IMSI) and information obtained or learned from a related SRI-SM message and a related MT-FSM message. For example, an example data entry or mapping may associated an IMSI with an MSC/VLR ID learned from a SRI-SM response message and with a timestamp and/or other timing information associated with a MT-FSM request message that traverses NN 108. In this example, the timestamp and/or other timing information (e.g., a configurable value indicating a number of seconds since a relevant a MT-FSM request message was forwarded by NN 108) may be usable for determining a validation time period, where the validation time period indicates an amount of time for a valid short message delivery status report to be received by NN 108.

In some embodiments, e.g., where validation time periods are used in validating or invalidating short message delivery status reports, NN 108 may identify a validation time period associated with a mobile subscriber, e.g., by obtaining, from SMVDS 118, timing information associated with an IMSI in a received short message delivery status report. After obtaining or deriving the validation time period associated with the mobile subscriber, NN 108 may determine whether the received short message delivery status report is received after a MT-FSM request message was forwarded by NN 108 but before the validation time period ends. For example, if a short message delivery status report is received by NN 108 within this validation time period then the short message delivery status report may be deemed valid and allowed to enter into network and reach HLR to set the MWI related parameters. In some embodiments, after a validation time period expires, a related data entry may be deleted from SMVDS 118 or a related data store. In another example, if a short message delivery status report is received and no matching data entries are found in SMVDS 118 then then the short message delivery status report may be deemed in valid and the short message delivery status report may be discarded, e.g., without it being forwarded to HLR 110 and/or processed by HLR 110.

Referring to FIG. 5, in step 501, SMSC 107 may generate and send a SRI-SM request message to NN 108. For example, a SRI-SM request message may be for requesting routing information associated with a mobile subscriber 'B' and may include a MSISDN or IMSI associated with the mobile subscriber 'B'.

In step 502, NN 108 may forward the SRI-SM request message to HLR 110.

In step 503, HLR 110 may return a SRI-SM response message including an IMSI 'B' associated with the mobile subscriber 'B' and a serving node identifier 'V' (e.g., indicating a serving VLR/MSC 105 associated with the mobile subscriber 'B') to NN 108.

In step 504, NN 108 may receive the SRI-SM response message and may modify the IMSI and serving node parameter values to enforce that a related MT-FSM request message is received by NN 108. For example, NN 108 may replace the IMSI 'B' associated with the mobile subscriber 'B' with a 'scrambled' IMSI 'C' and may replace the serving node identifier 'V' with its own identifier 'Z'.

In some embodiments, NN 108 may store an association between the original IMSI 'B' and the replaced IMSI 'C' and the original serving node identifier 'V' in a local or accessible data store, e.g., SMVDS 118.

In some embodiments, NN 108 may store an association between the original IMSI 'B' and the original serving node identifier 'V' in a local or accessible data store, e.g., SMVDS 118.

In step 505, NN 108 may forward the modified SRI-SM response message to SMSC 107.

In step 506, SMSC 107 may send a MT-FSM request message including parameters for IMSI 'C' and a serving node identifier 'Z' to NN 108.

In step 507, NN 108 may receive the MT-FSM request message and may replace the IMSI and serving node parameter values with the original parameter values found in the local or accessible data store. For example, NN 108 may query the data store using an IMSI 'C' in the received MT-FSM request message to find a data entry indicating the original IMSI 'B' and the original serving node identifier 'V'. In this example, NN 108 may then modify the MT-FSM request message by replacing the IMSI and serving node parameter values with the original parameter values.

In some embodiments, NN 108 may store a timestamp and/or other timing information associated with receiving an MT-FSM request message and may store the timestamp and/or other timing information in an existing association in a local or accessible data store, e.g., SMVDS 118. In such embodiments, the existing association may be identified using a recipient's IMSI in the MT-FSM request message.

In some embodiments, NN 108 may use timing information associated with an MT-FSM request message to identify a validation time period indicating an amount of time for a valid short message delivery status report to be received by NN 108. For example, NN 108 may use a receive timestamp indicating when an MT-FSM request message was received or forwarded by NN 108 as a starting point for a relevant validation time period, where the validation time period lasts for a configurable maximum allowed duration, e.g., a number of seconds.

In some embodiments, NN 108 may use a timer mechanism or other logic for determining when a relevant validation time period expires. For example, NN 108 may be configured to initiate a timer when an MT-FSM request message is received, where a valid short message delivery status report must be received before the timer expires.

In some embodiments, e.g., in lieu of an active timer, NN 108 may calculate a time difference based on a receive time of a short message delivery status report and a starting time of a validation time period (e.g., a receive time of a related MT-FSM request message) and may then determine if that the time difference is less than (or equal to) the maximum allowed duration (e.g., the configurable number of seconds indicating how long the validation time period lasts).

In step 508, NN 108 may forward the modified MT-FSM request message to VLR/MSC 105, e.g., based on the original serving node identifier.

In step 509, VLR/MSC 105 may perform a short message delivery procedure for attempting SMS delivery to the mobile subscriber 'B' (e.g., UE 102) and VLR/MSC 105 may receive a response indicating an SMS delivery status (e.g., failed or successful).

In step 510, VLR/MSC 105 may send a MT-FSM response message indicating the SMS delivery status to SMSC 107.

In step 511, SMSC 107 may send a MAP-REPORT-SM-DELIVERY-STATUS request message including MWI data indicating the SMS delivery status. For example, if SMS delivery was unsuccessful (e.g., because a mobile subscriber was absent or unreachable), then the MWI data may include a MSNRF or another parameter indicating that the mobile subscriber was absent or unreachable.

In some embodiments, NN 108 may validate the MAP-REPORT-SM-DELIVERY-STATUS request message using a relevant validation time period, e.g., derived from information in SMVDS 118. For example, after receiving a MAP-REPORT-SM-DELIVERY-STATUS request message indicating a SMS delivery status for the mobile subscriber 'B', NN 108 may be configured to identify a validation time period associated with the mobile subscriber 'B', e.g., by querying SMVDS 118 using a related IMSI. In this example, if the MAP-REPORT-SM-DELIVERY-STATUS request message is received before the validation time period expires, NN 108 may process the MAP-REPORT-SM-DELIVERY-STATUS request message and/or forward the MAP-REPORT-SM-DELIVERY-STATUS request message to HLR 110. Continuing with this example, if the MAP-REPORT-SM-DELIVERY-STATUS request message is received before the validation time period expires, NN 108 may discard the MAP-REPORT-SM-DELIVERY-STATUS request message.

In step 512, NN 108 may determine that the MAP-REPORT-SM-DELIVERY-STATUS request message is valid based on at least in part that the message was received by NN 108 prior to a relevant validation time period expiring.

In step 513, after validating the MAP-REPORT-SM-DELIVERY-STATUS request message, NN 108 may forward the MAP-REPORT-SM-DELIVERY-STATUS request message to HLR 110 and act on the MWI data therein.

It will be appreciated that FIG. 5 is for illustrative purposes and that different and/or additional messages and/or actions may be used. It will also be appreciated that various messages and/or actions described herein may occur in a different order or sequence.

Figure 6:
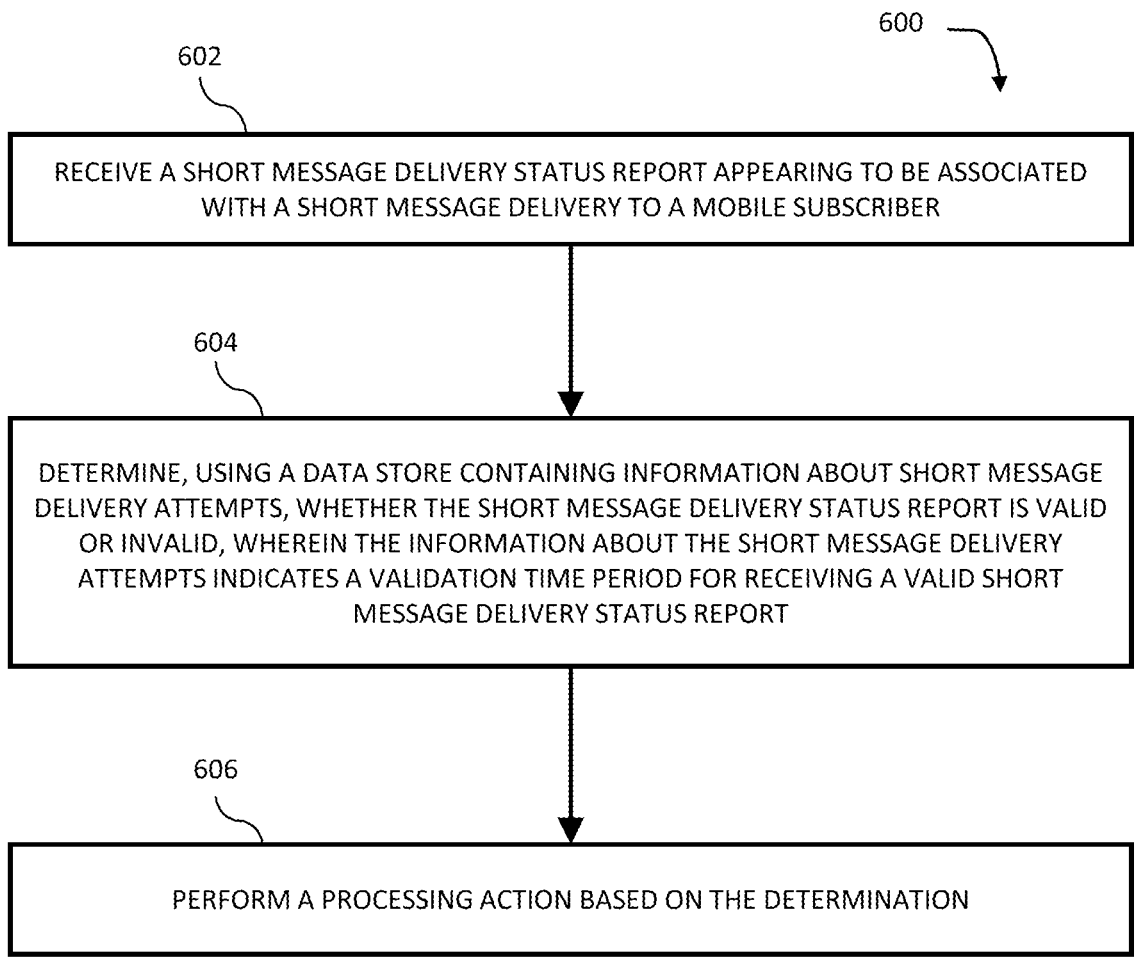
FIG. 6 is a diagram illustrating an example process for short message delivery status report validation.

FIG. 6 is a diagram illustrating an example process 600 for short message delivery status report validation. In some embodiments, example process 600 described herein, or portions thereof, may be performed at or performed by NN 108, node 200, SFW 204, and/or another module or node.

Referring to example process 600, in step 602, a short message delivery status report appearing to be associated with a short message delivery to a mobile subscriber may be received. For example, node 200 may receive a MAP-REPORT-SM-DELIVERY-STATUS request message (e.g., from SMSC 107) indicating that mobile subscriber 'B' is absent or unreachable.

In step 604, it may be determined, using a data store containing information about short message delivery attempts, whether the short message delivery status report is valid or invalid, wherein the information about the short message delivery attempts indicates a validation time period for receiving a valid short message delivery status report. For example, node 200 may query SMVDS 118 using an IMSI associated with a mobile subscriber 'B' to obtain information about a recent SMS delivery attempt involving mobile subscriber 'B'. In this example, the obtained information may include a timestamp for indicating when a forward short message request message (e.g., a MT-FSM request message) was forwarded to VLR/MSC 105 or may include timing information for indicating a validation time period usable to identify invalid short message delivery status reports.

In some embodiments, a validation time period may represent a period of time in which a valid message delivery status report can be received, e.g., by node 200 or NN 108. In some embodiments, a validation time period may exist for an amount of time (e.g., 45 seconds) from when a forward short message request message was received or forwarded by node 200, NN 108, or another entity. In some embodiments, the duration of a validation time period may be predetermined or dynamic and may be based on one or more factors, e.g., time of day, subscriber tier, current location, network traffic load or congestion, and/or other criteria.

In some embodiments, determining that a short message delivery status report appearing to be associated with a mobile subscriber is valid may include obtaining, using a subscriber identifier associated with the mobile subscriber in the short message delivery status report, a data entry of a data store that corresponds to the mobile subscriber and determining that a network node identifier indicating a sender of the short message delivery status report matches information in the data entry of the data store that corresponds to the mobile subscriber.

In some embodiments, determining that a short message delivery status report appearing to be associated with a mobile subscriber is valid may include determining that the short message delivery status report was received during or within a validation time period.

In some embodiments, determining that a short message delivery status report appearing to be associated with a mobile subscriber is invalid may include determining that the short message delivery status report was received after a validation time period expired or determining that a data store containing information about short message delivery attempts lacks information about a short message delivery attempt to the mobile subscriber.

In step 606, a processing action may be performed based on the determination. In some embodiments, a processing action for an invalid short message delivery status report may include discarding the short message delivery status report, notifying a user or management entity, or preventing the short message delivery status report from being sent to an HLR or an HSS. In some embodiments, a processing action for a valid short message delivery status report may include processing the short message delivery status report or sending or forwarding the short message delivery status report to an HLR or an HSS.

In some embodiments, process 600 may also include prior to receiving a short message delivery status report: receiving a send routing information for short message (SRI-SM) response message containing a subscriber identifier (e.g., an IMSI) indicating the mobile subscriber and a network node identifier (e.g., a VLR/MSC ID) indicating a current location of the mobile subscriber; storing the network node identifier in a data entry of the data store that corresponds to the mobile subscriber indicated by the subscriber identifier; forwarding the send routing information for short message response message to a requester; receiving and forwarding a forward short message request message associated with the mobile subscriber; and storing timing information (e.g., a timestamp and a duration for a validation time period) associated with the forward short message request message in the data entry of the data store that corresponds to the mobile subscriber.

In some embodiments, a subscriber identifier associated with a short message delivery status report or a related message may include IMSI, an IMEI, an MSISDN, or another equipment or subscriber identifier.

In some embodiments, a network node identifier associated with a short message delivery status report or a related message may include an MSC, a VLR, an MME, an SGSN, a gateway MSC (GMSC), a mobile switching center (MSC), a visitor location register (VLR), or a mobility management entity (MME).

In some embodiments, a short message delivery status report may include a MAP-REPORT-SM-DELIVERY-STATUS message or a Report-SM-Delivery-Status-Request (RDR) message and may include a Mobile-Station-Not-Reachable-Flag (MSNRF) or message waiting indication (MWI) data.

In some embodiments, short message delivery related messages (e.g., that traverse NN 108 or are received by node 200) may include an SRI-SM request message, an SRI-SM response message, and/or an MT-FSM request message.

In some embodiments, a network node for performing process 600 or aspects thereof may include a Diameter node, a Diameter routing agent, a Diameter signaling router, an SMS firewall, a gateway, a signaling router, an STP, a virtual STP, an HLR, or an HSS.

In some embodiments, e.g., where HLR 110 performs short message delivery status report validation, HLR 110 may access SMVDS 118 to obtain relevant short message delivery attempt related information. In this example, at least some information stored in SMVDS 118 may be provided by another network node (e.g., a DSR or vSTP), e.g., when one or more SMS related messages traverse that network node. Continuing with this example, HLR 110 may receive and validate short message delivery status reports before acting on them, e.g., before setting a MWI flag or a subscriber unreachable parameter for one or more mobile subscribers.

It will be appreciated that FIG. 6 is for illustrative purposes and that different and/or additional actions may be used. It will also be appreciated that various actions described herein may occur in a different order or sequence.

It will be appreciated that while some aspects of the subject matter described herein has been discussed with reference to SS7 and Diameter based mobile networks (e.g., 2G, 3G, 4G, LTE, EPC/EPS), various other networks may utilize some aspects of the subject matter described herein. For example, any network that utilize SMS related messages and/or includes a message routing node or an SMS firewall or proxy node may use features, mechanisms and techniques described herein to validate a short message delivery status report.

It will also be appreciated that some messages, procedures, and/or actions described above may be based at least in part on 3GPP TS 23.040; 3$^{rd}$ Generation Partnership Project; Technical Specification Group Core Network and Terminals; Technical realization of the Short Message Service (SMS) (Release 16), V16.0.0 (2020-07); the disclosure of which is incorporated herein by reference in its entirety to the extent not inconsistent herewith and to the extent that it supplements, explains, provides a background for, or teaches methods, techniques, and/or systems employed herein.

It should be noted that NN 108, node 200, and/or functionality described herein may constitute a special purpose computing device. Further, NN 108, node 200, and/or functionality described herein can improve the technological field of network security and/or fraud prevention. For example, by using validation time periods based at least in part on MT-FSM request messages, NN 108 or node 200 can validate received short message delivery status reports (e.g., MAP-REPORT-SM-DELIVERY-STATUS messages) and can perform one or more mitigating actions when a short message delivery status report is determined to be invalid (e.g., fraudulent), thereby preventing or mitigating malicious activities and related consequences (e.g., DoS for SMS messages).

It will be understood that various details of the subject matter described herein may be changed without departing from the scope of the subject matter described herein. Furthermore, the foregoing description is for the purpose of illustration only, and not for the purpose of limitation.

What is claimed is:

1. A method for validating a short message delivery status report, the method comprising:
    at a first network node and prior to receiving the short message delivery status report:
        receiving a send routing information for short message response message containing a subscriber identifier indicating a mobile subscriber and a network node identifier indicating a current location of the mobile subscriber;
        storing a network node identifier in a data entry of a data store that corresponds to the mobile subscriber indicated by the subscriber identifier;
        forwarding the send routing information for short message response message to a requester;
        receiving and forwarding a forward short message request message associated with the mobile subscriber; and
        storing timing information associated with the forward short message request message in the data entry of the data store that corresponds to the mobile subscriber;
    and further comprising, at the first network node:
        receiving the short message delivery status report appearing to be associated with a short message delivery to the mobile subscriber;
        determining, using the data store containing information about short message delivery attempts, whether the short message delivery status report is valid or invalid, wherein the information about the short message delivery attempts indicates a validation time period for receiving a valid short message delivery status report; and
        performing a processing action based on the determination.

2. The method of claim 1 wherein determining that the short message delivery status report is valid includes determining that the short message delivery status report was received during the validation time period, and wherein the processing action includes processing the short message delivery status report or sending or forwarding the short message delivery status report to a home location register or a home subscriber server.

3. The method of claim 1 wherein determining that the short message delivery status report is invalid includes determining that the short message delivery status report was received after the validation time period expired or determining that the data store lacks information about a short message delivery attempt to the mobile subscriber, and wherein the processing action includes discarding the short message delivery status report, notifying a user or management entity, or preventing the short message delivery status report from being sent to a home location register or a home subscriber server.

4. The method of claim 1 wherein the short message delivery status report includes a MAP-REPORT-SM-DELIVERY-STATUS message or a Report-SM-Delivery-Status-Request (RDR) message and includes a Mobile-Station-Not-Reachable-Flag (MSNRF) or message waiting indication (MWI) data.

5. The method of claim 1 wherein the first network node includes a Diameter node, a Diameter routing agent, a Diameter signaling router, a short message service (SMS) firewall, a gateway, a signaling router, a signal transfer point (STP), a virtual STP, a home location register (HLR), or a home subscriber server (HSS).

6. A method for validating a short message delivery status report, the method comprising:
at a first network node:
receiving the short message delivery status report appearing to be associated with a short message delivery to a mobile subscriber;
determining, using a data store containing information about short message delivery attempts, whether the short message delivery status report is valid or invalid, wherein the information about the short message delivery attempts indicates a validation time period for receiving a valid short message delivery status report; and
performing a processing action based on the determination, wherein determining that the short message delivery status report is valid includes obtaining, using a subscriber identifier in the short message delivery status report, a data entry of the data store that corresponds to the mobile subscriber and determining that a network node identifier indicating a sender of the short message delivery status report matches information in the data entry of the data store that corresponds to the mobile subscriber.

7. The method of claim 6 wherein the subscriber identifier includes an international mobile subscriber identity (IMSI), an international mobile equipment identity (IMEI), a mobile station international subscriber directory number (MSISDN), or an equipment or subscriber identifier.

8. The method of claim 6 wherein the network node identifier identifies a mobile switching center (MSC), a general packet radio service (GPRS) support node (SGSN), a gateway MSC (GMSC), a visitor location register (VLR), or a mobility management entity (MME).

9. A system for validating a short message delivery status report, the system comprising:
a first network node comprising:
at least one processor; and
a memory,
wherein the first network node is configured for, prior to receiving the short message delivery status report:
receiving a send routing information for short message response message containing a subscriber identifier indicating a mobile subscriber and a network node identifier indicating a current location of the mobile subscriber;
storing a network node identifier in a data entry of a data store that corresponds to the mobile subscriber indicated by the subscriber identifier;
forwarding the send routing information for short message response message to a requester;
receiving and forwarding a forward short message request message associated with the mobile subscriber; and
storing timing information associated with the forward short message request message in the data entry of the data store that corresponds to the mobile subscriber and wherein the first network node is further configured for:
receiving the short message delivery status report appearing to be associated with a short message delivery to the mobile subscriber;
determining, using the data store containing information about short message delivery attempts, whether the short message delivery status report is valid or invalid, wherein the information about the short message delivery attempts indicates a validation time period for receiving a valid short message delivery status report; and
performing a processing action based on the determination.

10. The system of claim 9 wherein determining that the short message delivery status report is valid includes determining that the short message delivery status report was received during the validation time period, and wherein the processing action includes sending or forwarding the short message delivery status report to a home location register or a home subscriber server.

11. The system of claim 9 wherein determining that the short message delivery status report is invalid includes determining that the short message delivery status report was received after the validation time period expired or determining that the data store lacks information about a short message delivery attempt to the mobile subscriber, and wherein the processing action includes discarding the short message delivery status report, notifying a user or management entity; and preventing the short message delivery status report from being sent to a home location register or a home subscriber server.

12. The system of claim 9 wherein the short message delivery status report includes a MAP-REPORT-SM-DELIVERY-STATUS message or a Report-SM-Delivery-Status-Request (RDR) message and includes a Mobile-Station-Not-Reachable-Flag (MSNRF) or message waiting indication (MWI) data.

13. The system of claim 9 wherein the first network node includes a Diameter node, a Diameter routing agent, a Diameter signaling router, a short message service (SMS) firewall, a gateway, a signaling router, a signal transfer point (STP), a virtual STP, a home location register (HLR), or a home subscriber server (HSS).

14. A system for validating a short message delivery status report, the system comprising:
a first network node comprising:
at least one processor; and
a memory,
wherein the first network node is configured for:
receiving the short message delivery status report appearing to be associated with a short message delivery to a mobile subscriber;
determining, using a data store containing information about short message delivery attempts, whether the short message delivery status report is valid or invalid, wherein the information about the short message delivery attempts indicates a validation time period for receiving a valid short message delivery status report; and
performing a processing action based on the determination, wherein determining that the short message delivery status report is valid includes obtaining, using a subscriber identifier in the short message delivery status report, a data entry of the data store that corresponds to the mobile subscriber and determining that a network node identifier indicating a sender of the short message delivery status report matches information in the data entry of the data store that corresponds to the mobile subscriber.

15. The system of claim 14 wherein the subscriber identifier includes an international mobile subscriber identity (IMSI), an international mobile equipment identity (IMEI), a mobile station international subscriber directory number (MSISDN), or an equipment or subscriber identifier.

16. The system of claim 14 wherein the network node identifier identifies a mobile switching center (MSC), a general packet radio service (GPRS) support node (SGSN), a gateway MSC (GMSC), a visitor location register (VLR), or a mobility management entity (MME).

17. A non-transitory computer readable medium comprising computer executable instructions embodied in the non-transitory computer readable medium that when executed by at least one processor of at least one computer cause the at least one computer to perform steps comprising:

at a first network node and prior to receiving a short message delivery status report:

receiving a send routing information for short message response message containing a subscriber identifier indicating a mobile subscriber and a network node identifier indicating a current location of the mobile subscriber;

storing a network node identifier in a data entry of a data store that corresponds to the mobile subscriber indicated by the subscriber identifier;

forwarding the send routing information for short message response message to a requester;

receiving and forwarding a forward short message request message associated with the mobile subscriber; and storing timing information associated with the forward short message request message in the data entry of the data store that corresponds to the mobile subscriber;

and further comprising, at the first network node:

receiving the short message delivery status report appearing to be associated with a short message delivery to the mobile subscriber;

determining, using the data store containing information about short message delivery attempts, whether the short message delivery status report is valid or invalid, wherein the information about the short message delivery attempts indicates a validation time period for receiving a valid short message delivery status report; and performing a processing action based on the determination.

* * * * *

UNITED STATES PATENT AND TRADEMARK OFFICE
CERTIFICATE OF CORRECTION

PATENT NO. : 11,700,510 B2
APPLICATION NO. : 17/175260
DATED : July 11, 2023
INVENTOR(S) : Chaurasia et al.

It is certified that error appears in the above-identified patent and that said Letters Patent is hereby corrected as shown below:

On the Title Page

On page 4, Column 1, under Foreign Patent Documents, Line 15, delete "CN Z L201880040478.3" and insert -- CN 201880040478.3 -- therefor.

On page 4, Column 1, under Foreign Patent Documents, Line 17, delete "CN ZL 201880014277.6" and insert -- CN 201880014277.6 -- therefor.

On page 4, Column 1, under Foreign Patent Documents, Line 18, delete "CN ZL 201880014297.3" and insert -- CN 201880014297.3 -- therefor.

On page 4, Column 1, under Foreign Patent Documents, Line 18, delete "CN ZL202080007649.X" and insert -- CN 202080007649.X -- therefor.

On page 7, Column 2, under Other Publications, Line 40, delete ""Digitial" and insert -- "Digital -- therefor.

On page 7, Column 2, under Other Publications, Line 66, delete "Monile" and insert -- Mobile -- therefor.

On page 8, Column 1, under Other Publications, Line 42, delete "Internatioanl" and insert -- International -- therefor.

On page 10, Column 1, under Other Publications, Line 53, delete "Applicatons" and insert -- Applications -- therefor.

On page 12, Column 1, under Other Publications, Line 41, delete "forthe" and insert -- for the -- therefor.

Signed and Sealed this
Fourth Day of June, 2024

Katherine Kelly Vidal
*Director of the United States Patent and Trademark Office*